(12) United States Patent
Watanabe et al.

(10) Patent No.: US 9,246,145 B2
(45) Date of Patent: Jan. 26, 2016

(54) ASSEMBLED BATTERY AND MANUFACTURING METHOD THEREOF

(75) Inventors: Masashi Watanabe, Atsugi (JP); Yuuji Tanjou, Yokohama (JP); Masayasu Ota, Yokohama (JP); Tsuyoshi Enokida, Yamato (JP); Hiroaki Kishimoto, Sagamihara (JP); Ryuichi Amagai, Isehara (JP); Teruo Segawa, Ayase (JP); Muneto Hayami, Zama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 1362 days.

(21) Appl. No.: 11/597,907

(22) PCT Filed: May 30, 2005

(86) PCT No.: PCT/JP2005/009904
§ 371 (c)(1),
(2), (4) Date: Nov. 29, 2006

(87) PCT Pub. No.: WO2005/117163
PCT Pub. Date: Dec. 8, 2005

(65) Prior Publication Data
US 2008/0070102 A1    Mar. 20, 2008

(30) Foreign Application Priority Data

May 31, 2004  (JP) .................. 2004-161299
Dec. 15, 2004  (JP) .................. 2004-363123
Mar. 10, 2005  (JP) .................. 2005-068230

(51) Int. Cl.
 H01M 2/10   (2006.01)
 H01M 2/20   (2006.01)

(52) U.S. Cl.
 CPC ............ *H01M 2/1061* (2013.01); *H01M 2/208* (2013.01); *Y10T 29/49108* (2015.01)

(58) Field of Classification Search
 CPC ........................... H01M 2/1061; H01M 2/206
 See application file for complete search history.

(56) References Cited

U.S. PATENT DOCUMENTS

| | | | |
|---|---|---|---|
| 5,230,967 A | 7/1993 | Radmall | |
| 5,585,206 A | 12/1996 | Morris | |
| 6,159,633 A | 12/2000 | Yang | |
| 6,287,721 B1 * | 9/2001 | Xie et al. | 429/152 |
| 6,531,247 B1 | 3/2003 | Yang | |
| 6,555,264 B1 | 4/2003 | Hamada et al. | |
| 2002/0146620 A1 * | 10/2002 | Connell | 429/161 |
| 2003/0077508 A1 | 4/2003 | Asahina et al. | |
| 2003/0224246 A1 * | 12/2003 | Watanabe et al. | 429/159 |
| 2004/0002001 A1 | 1/2004 | Watanabe | |

FOREIGN PATENT DOCUMENTS

| | | |
|---|---|---|
| CN | 1223477 A | 7/1999 |
| CN | 1291796 A | 4/2001 |

(Continued)

*Primary Examiner* — Helen O Conley
(74) *Attorney, Agent, or Firm* — Foley & Lardner LLP

(57) ABSTRACT

A combined battery (100) comprising a plurality of flat-type cells (10A to 10F) by laminating thereof so that polarity of electrode tabs (11A to 11F and 12A to 12F) is alternately set, wherein welding parts to connect in series the flat cells themselves, to compose a set when all the flat-type cells (10A to 10F) are laminated, are separated at a plurality of positions of the combined battery, and the flat-type cells having such a structure that all the flat-type cells are electrically connected in series by welding each of the welding parts.

24 Claims, 40 Drawing Sheets

(56) References Cited

FOREIGN PATENT DOCUMENTS

| | | |
|---|---|---|
| JP | 9-147830 A | 6/1997 |
| JP | 10-106531 A | 4/1998 |
| JP | 2003-323879 A | 11/2003 |
| JP | 2003-323883 A | 11/2003 |
| JP | 2003-346748 A | 12/2003 |
| JP | 2003-346780 A | 12/2003 |
| JP | 2004-014317 A | 1/2004 |
| JP | 2004-031136 A | 1/2004 |
| JP | 2004-031195 A | 1/2004 |
| JP | 2004-031255 A | 1/2004 |
| JP | 2006-179411 a | 7/2006 |
| WO | WO 00/41253 A1 | 7/2000 |

* cited by examiner (A)

(B)

ASSEMBLED BATTERY AND MANUFACTURING METHOD THEREOF

TECHNICAL FIELD

This invention relates to a combined battery for which ultrasonic welding of electrode tabs themselves of flat-type cells is easily performed and a method for producing the same.

BACKGROUND ART

Recently, responding to rising environmental awareness, there is a movement to shift the power source of automobiles from engines using fossil fuel, to motors utilizing electrical energy. Therefore technology of a battery to be used as the power source of motors has rapidly been developing.

An automobile is desired to mount a compact-size and light-weight battery, capable of charging and discharging high power frequently, and excellent in vibration resistance and heat radiation performance. In response to such requirements, a combined battery constructed by connecting a large number of flat-type cells in series, has recently been developed as shown in JP-A-2004-31136.

DISCLOSURE OF INVENTION

A combined battery providing higher voltage is desired so as to charge and discharge high power in high efficiency. A combined battery providing higher voltage requires connecting a plurality of flat-type cells in series to construct the combined battery. To connect a plurality of flat-type cells in series, electrode tabs are welded by laminating thereof so that the directions of electrode tabs of the flat-type cells, the plus and the minus, are made alternate, composing a set of the plus and the minus electrode tabs of the laminated flat-type cells, and welding the plus and the minus electrode tabs themselves to compose a set, by using an ultrasonic welding machine or by using mechanical means including washers and the like, in order from the bottom or the top in the lamination direction.

But, these welding methods have the following problems.

First, in the case of welding by using an ultrasonic welding machine, because only the electrode tabs to be welded (the plus and the minus tabs to compose a set), have to be sandwiched by the head of the ultrasonic welding machine, welding can not be performed in the laminated state of all the combined batteries, and to ensure an insertion space for the head, it is necessary for other flat type cells except those to be welded to be moved (to be opened vertically in the lamination direction) once, therefore, not only the operation is troublesome, but the operation has such problems that automation of the operation is difficult and unnecessary stress is applied to the electrode tabs already welded, and the like.

Next, in the case of mechanical bonding, because mechanical means including bolts, nuts and washers, has to be used, it could generate contact resistance variation or loosening due to vibration, and thus there are problems in endurance-reliability and maintainability.

It is an object of the present invention to provide a combined battery for which ultrasonic welding of electrode tabs themselves of flat-type cells is easily performed, being excellent in endurance-reliability and maintainability, and a method for producing the same.

Other objectives, features and advantages of the present invention will become apparent by referring to the following description and preferred Embodiments described in attached drawings.

BEST MODES FOR CARRYING OUT THE INVENTION

A combined battery and a method for producing the same according to the present invention will be explained in detail below based on drawings. The present Embodiment will be explained classifying into the following 10 Embodiments:

"Embodiment 1", wherein a combined battery is constructed with 8 sheets of 6 types of flat-type cells different in electrode tab shape thereof;

"Embodiment 2", wherein a combined battery is constructed with 12 sheets of 4 types of flat-type cells different in electrode tab shape thereof;

"Embodiment 3", wherein a combined battery is constructed with 8 sheets of 3 types of flat-type cells different in electrode tab shape thereof;

"Embodiment 4", wherein a combined battery is constructed with 8 sheets of 4 types of flat-type cells different in electrode tab shape thereof;

"Embodiment 5", wherein a combined battery is constructed with 8 sheets of 6 types of flat-type cells different in electrode tab length thereof;

"Embodiment 6", wherein a combined battery is constructed with 8 sheets of 3 types of flat-type cells different in electrode tab length thereof;

"Embodiment 7", wherein a combined battery is constructed with 8 sheets of 7 types of flat-type cells different in electrode tab length and shape thereof;

"Embodiment 8", wherein a combined battery is constructed with 8 sheets of 6 types of flat-type cells different in positions for the electrode tabs to be pulled out;

"Embodiment 9", wherein a combined battery is constructed with circular flat-type cells having electrode tabs arranged in specified central angles; and "Embodiment 10", wherein a combined battery is constructed by folding sheet-like cells, which are composed of a plurality of flat-type cells sequentially connected.

EMBODIMENT 1

Figure 1:
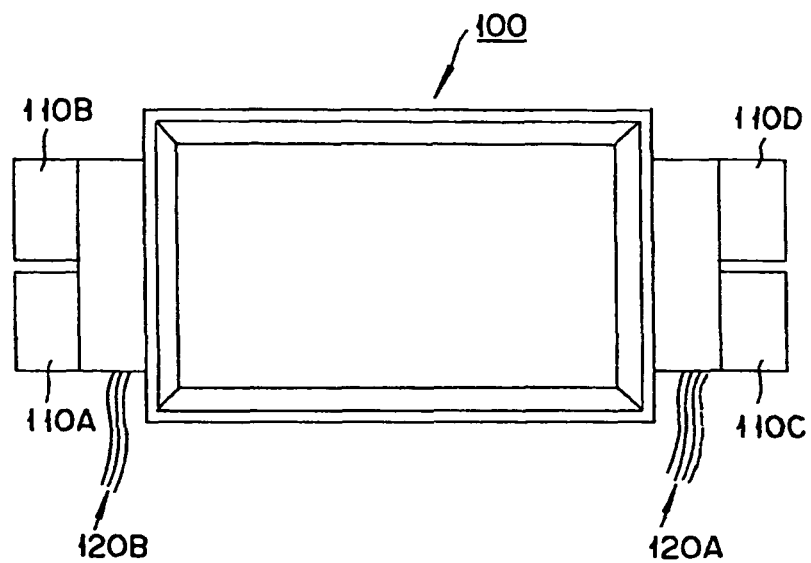
FIG. 1 is an outline view of a combined battery according to Embodiment 1 relevant to the present invention.

FIG. 1 is an outline view of a combined battery according to Embodiment 1 relevant to the present invention. The combined battery 100 according to the present Embodiment includes 8 sheets of flat-type cells by laminating thereof in the thickness direction thereof so that polarity of electrode tabs is alternately set. The combined battery 100 according to the present Embodiment includes welding parts of the electrode tabs to connect the flat-type cells themselves in series, to compose a set when all the flat-type cells are laminated, separating at a plurality of positions of the combined battery, and such a structure that all the flat-type cells are electrically connected in series by welding each of the welding parts. Specifically, the flat-type cell is rectangular in shape when viewed from the top and the welding parts of electrode tabs are arranged so that the positions thereof may be changed in the length direction (the horizontal direction in the figure) thereof or in the shorter-length direction (the vertical direction in the figure) thereof in each lamination layer position. Therefore each one of electrode tabs pulled out from both sides of the flat-type cell has a specific shape in each lamination layer position so that each set of electrode tabs when 8 sheets of the flat-type cells are laminated, may be separated into 4 directions thereof.

And an insulating sheet, not shown in the figure, is inserted between all the flat-type cells to provide a function to detect voltage of each one of the flat-type cells and to insulate between the electrode tabs to be insulated. The insulating sheet has a specific shape like that of the electrode tab in each lamination layer position to provide the above-mentioned functions.

Figure 2:
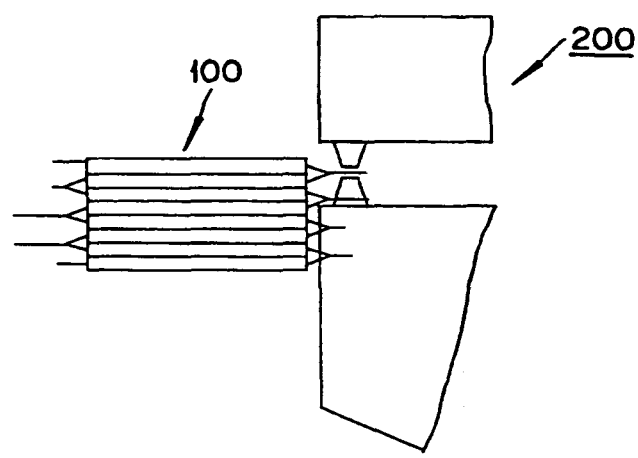
FIG. 2 is a drawing showing welding state of welding electrode tabs of laminated flat-type cells with an ultrasonic welding machine.

A combined battery 100 is composed of all the flat-type cells electrically connected in series by welding electrode tabs of the flat-type cells laminated by using the ultrasonic welding machine 200 shown in FIG. 2. The electrode tabs of the combined battery include the 4 protruding parts thereof separated in 4 directions as shown in FIG. 1. Therefore ultrasonic welding of a group of electrode tabs 110A is capable of connecting the flat-type cell located at the top and the lower next themselves in series, and ultrasonic welding of a group of electrode tabs 110B is capable of connecting the flat-type cell located at the third top and the lower next themselves in series, and ultrasonic welding of a group of electrode tabs 110C is capable of connecting the flat-type cell located at the third bottom and the upper next themselves in series, and ultrasonic welding of a group of electrode tabs 110D is capable of connecting the flat-type cell located at the bottom and the upper next themselves in series. When 4 electrode tab groups separated in 4 directions as described above, are subjected to ultrasonic welding, all of the 8 sheets of flat-type cells are electrically connected in series.

And in the insulating sheet functioning as an insulating body located between flat-type cells, a voltage detection terminal, not shown in the figure, to provide the function to detect voltage of a flat-type cell is installed at one surface side thereof. As a lead wire is connected to the voltage detection terminal, a group of 4 lead wires 120A from one side of the combined battery 100 and a group of 3 lead wires 120B from the other side thereof are pulled out. Each two of the lead wires is connected to a voltage detector, not shown in the figure, so that operating state of each flat-type cell may be checked by monitoring voltage thereof.

In the combined battery according to the present Embodiment, because electrical connection of all of the flat-type cells laminated, can be performed independently at 4 parts without overlapping in the laminating direction, all of the flat-type cells may to be welded while in laminated state, good operability is obtained, and further, welding automation is easy. Furthermore, as extra stress is not applied to the electrode tabs already welded thereby and there is no mechanical bonding part, endurance-reliability and maintainability is high.

When the combined battery according to the present Embodiment is mounted on a vehicle, the combined batteries are laminated in 3 layers thereof with heat sinks presented inter—the combined batteries, the 3 lamination layers are arranged in 4 rows, and all of the combined batteries are fixed with heat sinks so as to be sandwiched from both sides in the lamination direction thereof. Heat sinks presented at both sides in the lamination direction are fixed so as to attract each other with specified force. Therefore specified compression strength is evenly applied to every flat-type cell.

Figure 3:
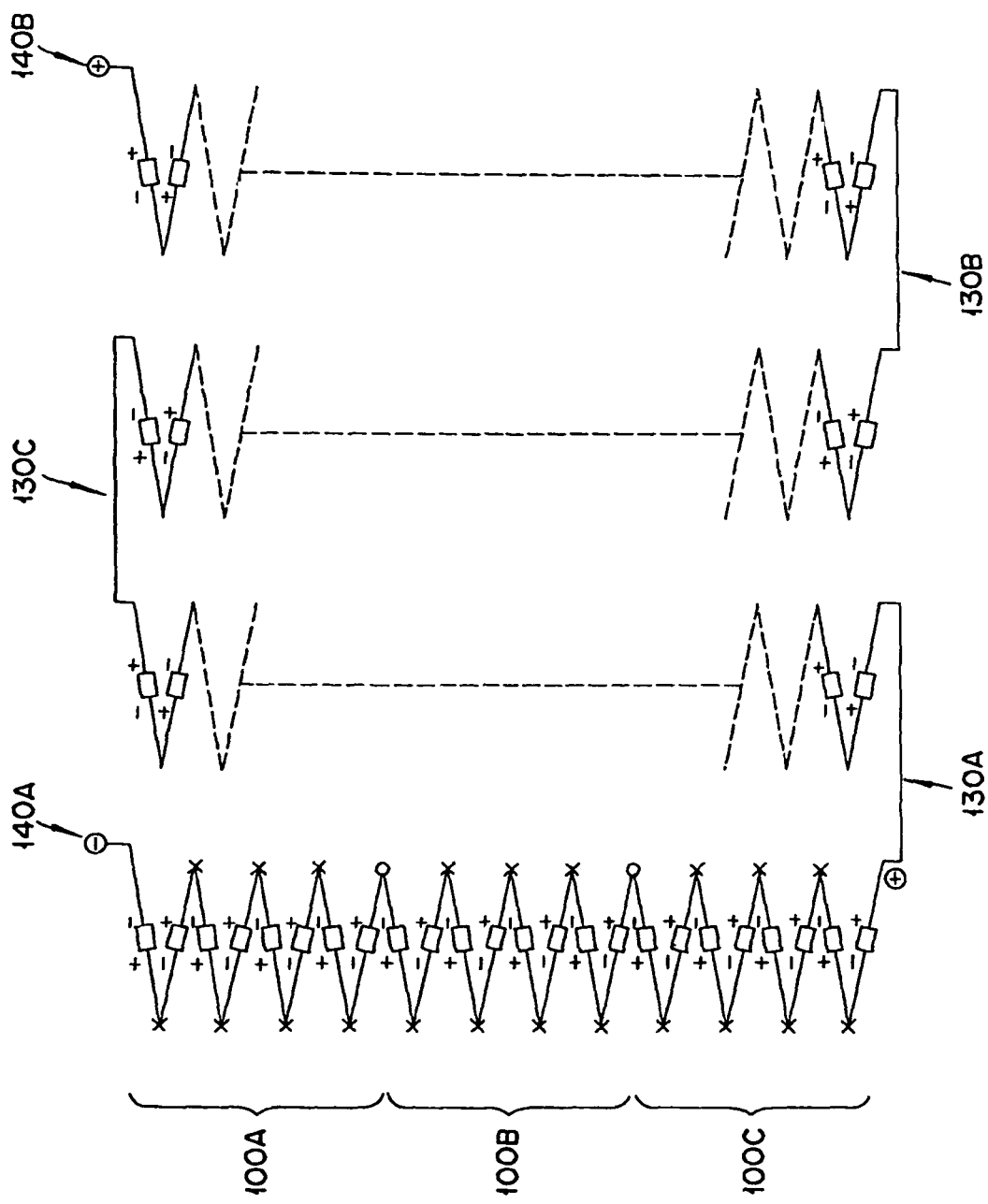
FIG. 3 is a drawing showing an electrically connected state of a flat-type cell.

As stated above, 12 combined batteries including 3 layers by 4 rows are all connected in series by directly connecting the electrode tabs themselves located in the lamination direction, and by connecting with bus-bars the electrode tabs themselves adjacently located at the top or the bottom thereof. This electrically connected situation is shown in FIG. 3. As shown in the figure, combined batteries 100A, 100B and 100C composed of 3 layers of the first row, are all connected in series in the lamination direction. In addition, electrode tabs of flat-type cells (indicated as X-mark in the figure) composing each combined battery of 100A, 100B and 100C, are welded themselves by ultrasonic welding as stated above and electrode tabs of each combined battery (indicated as O-mark in the figure) are connected by welding. Connection of electrode tabs of each combined battery in 2 to 4 rows also are conducted similarly as in the first row. And electrode tabs of each combined battery located at the bottom are connected by welding to the bus-bars 130A and 130B, and electrode tabs of each combined battery located at the top are connected by welding to the bus-bar 130C.

When every combined battery is connected in series, then 96 sheets of flat-type cells including 8 sheets by 3 layers by 4 rows, are all connected in series and a high voltage of 370 V including 3.85 V/sheet by 96 sheets, can be obtained thereby between the electric terminals 140A and 140B of heat sinks located at one side in the lamination direction.

Next, a method for producing a combined battery according to the present Embodiment will be explained.

Figure 4:
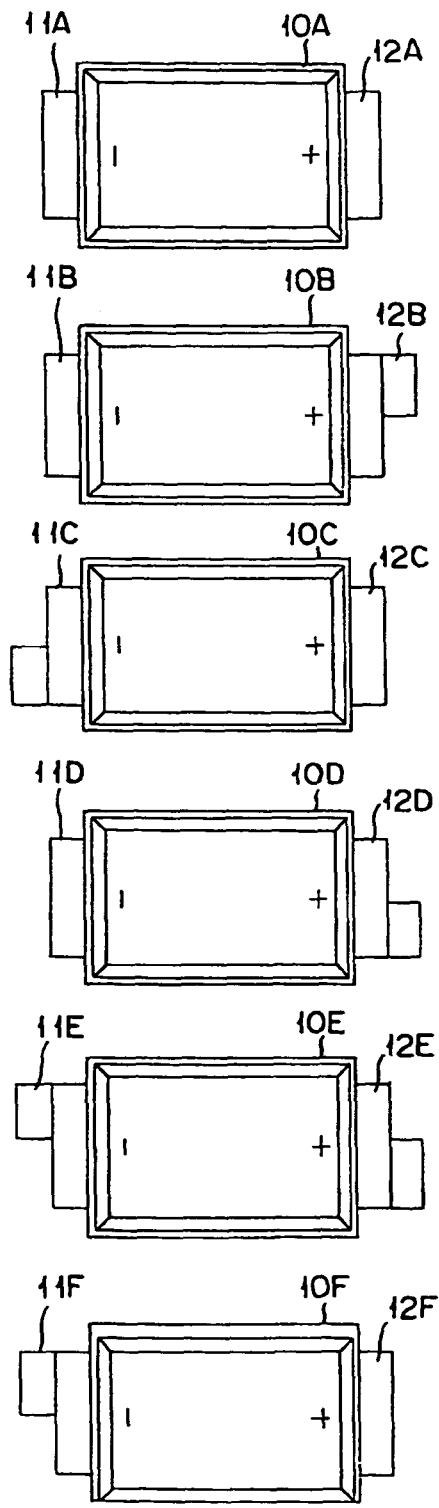
FIG. 4 is a drawing showing flat-type cells required for constructing a combined battery according to Embodiment 1.

The combined battery 100 according to the present Embodiment has at least one of the plus side or the minus side of the electrode tab with a L-character shape, except the flat-type cell 10A shown in FIG. 4, to separate welding parts of the electrode tabs into 4 directions and makes the shape of the electrode tab of each flat-type cell different according to the position of lamination layer so that welding parts of the electrode tabs are separated into a plurality of positions when the flat-type cell are laminated. FIG. 4 shows the types of flat-type cells (electrode tab shapes are different) required for constructing the combined battery 100 according to the present Embodiment. While the combined battery 100 is composed of 8 laminated sheets of flat-type cells, the flat-type cells having 6 types of electrode tab shapes, as shown in the figure, are necessary to separate welding positions of the electrode tabs into 4 directions.

First, the flat-type cell 10A located at the bottom is one having electrode tabs with the same rectangular shape at both sides. The flat-type cell 10B located at the second bottom has the electrode tab 11B at one side with the same rectangular shape as the electrode tab of the flat-type cell 10A, and has the electrode tab 12B at the other side with an inverted L-character shape. The flat-type cell 10C located at the third bottom has the electrode tab 11C at one side with the inverted L-character shape and has the electrode tab 12C at the other side with the rectangular shape. The flat-type cell 10D located at the fourth bottom has the electrode tab 11D at one side with the rectangular shape, and has the electrode tab 12D at the other side with the inverted L-character shape. The flat-type cell 10E located at the fifth bottom has the electrode tab 11E at one side with an inverted and further turned upside down L-character shape, and has the electrode tab 12E at the other side with the inverted L-character shape like the flat-type cell 10D. Finally, the flat-type cell 10F located at the six bottom has the electrode tab 11F with the inverted and further turned upside down L-character shape like the flat-type cell 10E and has the electrode tab 12F at the other side with the rectangular shape. In addition, as the flat-type cell located at the top, the same one as the flat-type cell 10C is laminated, and as the flat-type cell located at the second top, the same one as the flat-type cell 10B is laminated.

Types of the flat-type cells to be prepared are described above on the assumption that the flat-type cell can not be laminated by turning inside out thereof. However, if the flat-type cell can be laminated by turning inside out thereof, the flat-type cell 10B turned inside out can commonly be used as the flat-type cell 10D, and the flat-type cell 10C turned inside out can be commonly used as well as the flat-type cell 10F, and in this case preparation of only 4 types of flat-type cells is required.

Figure 5:
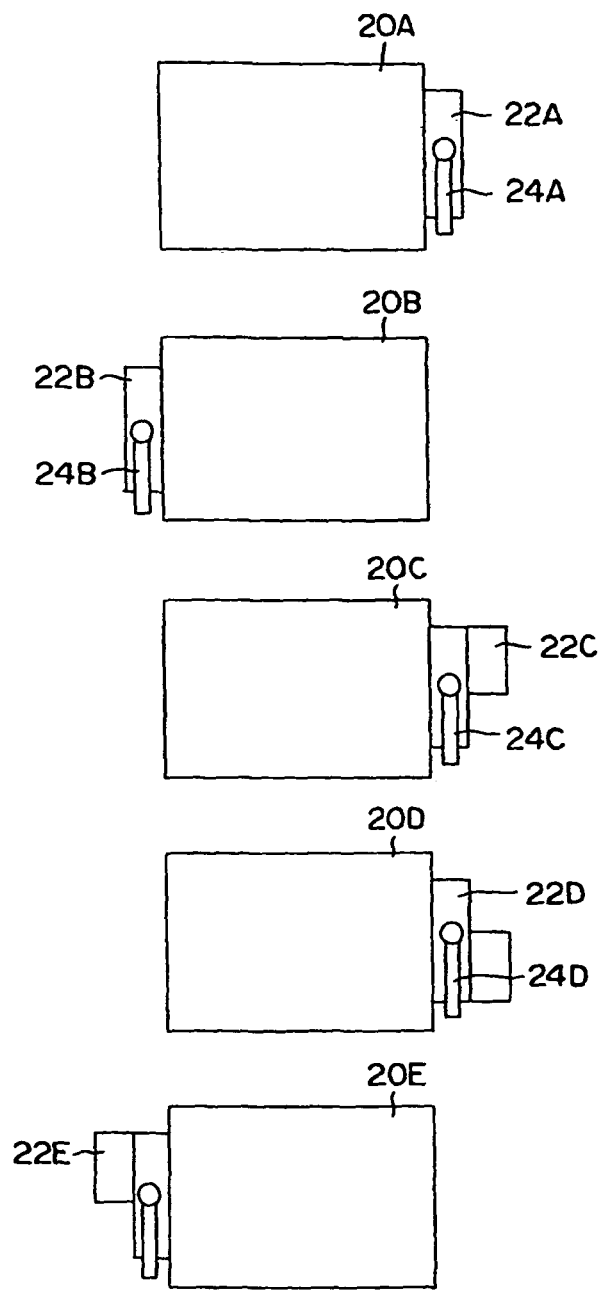
FIG. 5 is a drawing showing insulation sheets required for constructing a combined battery according to Embodiment 1.

In the combined battery 100 according to the present Embodiment, 7 insulation sheets are used for insulating between the flat-type cells and detecting voltage of a flat-type cell. An insulating sheet is made changed in shape like the flat-type cell according to the lamination layer position thereof. FIG. 5 shows types of the insulating sheets required for constructing the combined battery 100 according to the present Embodiment. 5 Types of the insulating sheets as shown in the Figure are necessary for insulating between the flat-type cells to be insulated.

First, the insulating sheet 20A is one formed with the electrode tab insulating part 22A at the position, for example, corresponding to the electrode tab 12A of the flat-type cell 10A, for example, having no protruding part at the electrode tab, and the voltage detecting terminal 24A is installed at the electrode tab insulating part 22A. The voltage detecting terminal 24A is bonded on one side of the electrode tab insulating part 22A. Therefore the voltage detecting terminal 24A provides voltage of a flat-type cell through an electrode tab contacting with the terminal when laminated. Though not shown in the figure, a lead wire is connected to the voltage detecting terminal 24A, and is connected to a voltage detector or the like located outside.

In the insulating sheet 20B, unlike the insulating sheet 20A, the position, where the electrode tab insulating part 22B is installed, is 180 degrees different in angle. The voltage detecting terminal 24B is bonded on the electrode tab insulating part 22B.

The insulating sheet 20C is one formed with the electrode tab insulating part 22C at the position, for example, corresponding to the inverted L-character shape electrode tab 12B of the flat-type cell 10B, for example, having a protruding part at the electrode tab, and the voltage detecting terminal 24C is bonded at a not-protruding part of the electrode tab insulating part 22C.

The insulating sheet 20D is different from the insulating sheet 20C in that the electrode tab insulating part 22C has L-character shape. The voltage detecting terminal 24D is installed at a not-protruding part of the electrode tab insulating part 22D.

In the insulating sheet 20E, unlike the insulating sheet 20C, the position, where the electrode tab insulating part 22E is installed, is 180 degrees different in angle. The voltage detecting terminal 24E is bonded on the electrode tab insulating part 22E.

Figure 6:
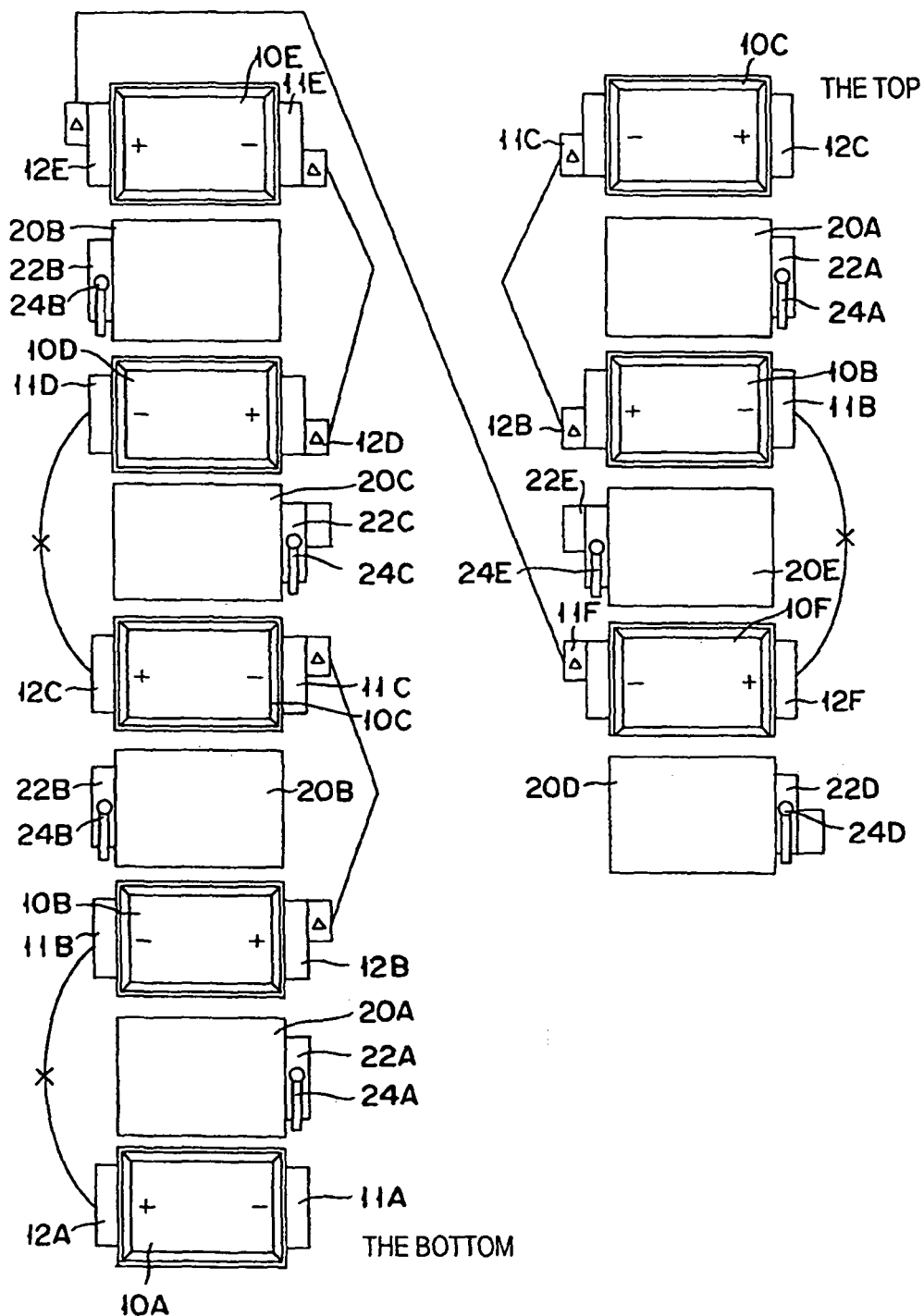
FIG. 6 is a drawing for explaining a production process of a combined battery according to Embodiment 1.
Figure 7:
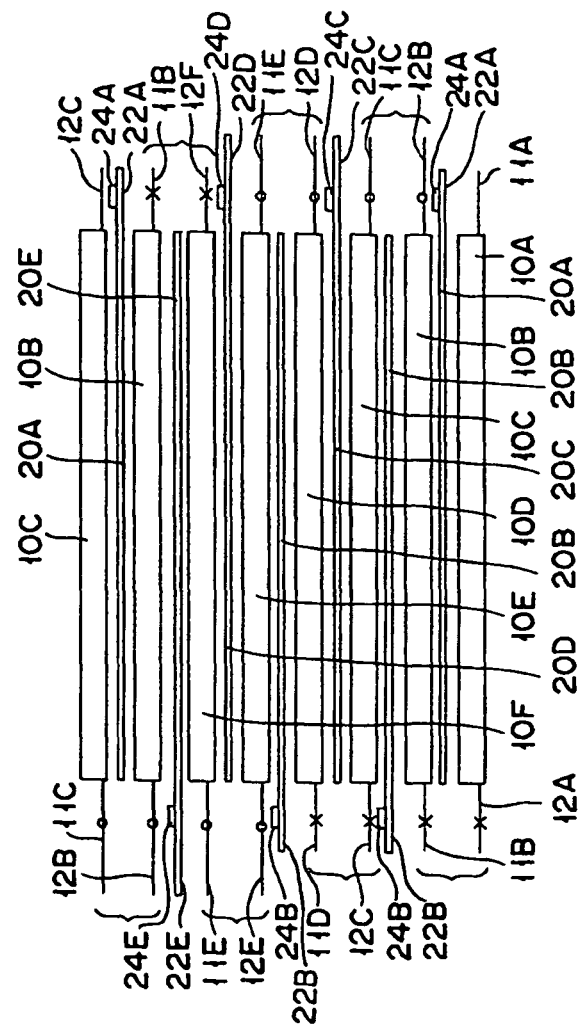
FIG. 7 is a drawing for explaining a production process of a combined battery according to Embodiment 1.

In the case of producing the combined battery according to the present Embodiment, the flat-type cells and the insulating sheets are arranged as shown in FIG. 6 and laminated as shown in FIG. 7. Specifically, from the bottom to the top, the flat-type cell 10A shown in FIG. 4, the insulating sheet 20A shown in FIG. 5, the flat-type cell 10B, the insulating sheet 20B, the flat-type cell 10C, the insulating sheet 20C, the flat-type cell 10D, the insulating sheet 20B, the flat-type cell 10E, the insulating sheet 20D, the flat-type cell 10F, the insulating sheet 20E, the flat-type cell 10B, the insulating sheet 20A and the flat-type cell 10C are laminated in order.

Before laminated, units are produced in advance by ultrasonic welding of the electrode tabs themselves indicated by X-mark in FIG. 6. The number of units produced in advance, is 3 units as shown in FIG. 6.

First, a plurality of units are produced by welding the electrode tabs themselves of the flat-type cells with making an insulating body present inter-the flat-type cells to compose a set. That is, the insulating sheet 20A is placed on the flat-type cell 10A and further the flat-type cell 10B is placed thereon. The insulating sheet 20A is arranged so that the voltage detecting terminal 24A may contact with the plus side electrode tab 12B of the flat-type cell 10B. Ultrasonic welding is applied to the plus side electrode tab 12A of the flat-type cell 10A, and the minus side electrode tab 11B of the flat-type cell 10B. As ultrasonic-welding is finished, the unit including the flat-type cells 10A and 10B with the insulating sheet 20A in sandwiched state therebetween, is formed. The formation of a unit is performed as well for the unit including the flat-type cells 10C and 10D with the insulating sheet 20C in sandwiched state therebetween and the unit including the flat-type cells 10B and 10F with the insulating sheet 20E in sandwiched state therebetween.

Next, the flat-type cells and the insulating bodies are laminated so that the flat-type cells and the insulating body are alternatively laminated in combination of the units, the flat-type cells themselves and the insulating bodies, and welding parts of the electrode tabs to connect the flat-type cells themselves in series, to compose a set when all the flat-type cells are laminated, are separated at different positions. That is, when the flat-type cells and the insulating bodies combined with the units produced as described above, are laminated as shown in FIG. 7, the combined battery 100 is formed with the appearance as shown in FIG. 1. When the combined battery 100 with all the electrode tabs in not yet welded state, is set to the ultrasonic welding machine 200 and the group of electrode tabs 110A is first subjected to ultrasonic welding as shown in FIG. 2, the minus side electrode tab 11C of the flat-type cell 10C located at the top, and the plus side electrode tab 12B of the flat-type cell 10B located at the second top are welded. The part where ultrasonic welding is applied is the protruding parts of the electrode tab 11C and the electrode tab 12B, indicated by Δ-mark in the figure. As the flat-type cell 10B and the flat-type cell 10F located at the lower next position form a unit, the electrode tabs 11B and 12F thereof are already welded, and the electrode tab insulating part 22A of the insulating sheet 20A, insulates the electrode tab 12C of the flat-type cell 10C from the electrode tab 11B of the flat-type cell 10B, and the electrode tab insulating part 22E of the insulating sheet 20E insulates the electrode tab 12B of the flat-type cell 10B from the electrode tab 11F of the flat-type cell 10F, therefore 3 sheets of the flat-type cells 10C, 10B and 10F are electrically connected in series by welding a group of the electrode tabs 110A. In addition, as the voltage detecting terminal 24A on the insulating sheet 20A contacts with the electrode tab 12C of the flat-type cell 10C, and the voltage detecting terminal 24E on the insulating sheet 20E contacts with the electrode tab 12B of the flat-type cell 10B, voltage of the flat-type cell 10C can be detected by measuring voltage between the voltage detecting terminals 24A and 24E.

Next, when a group of electrode tabs 110B is subjected to ultrasonic welding (refer to FIG. 2), the minus side electrode tab 11F of the flat-type cell 10F and the plus side electrode tab 12E of the flat-type cell 10E located lower next, are welded. The part, where ultrasonic welding is applied, is the protruding parts of the electrode tab 11F and the electrode tab 12E, indicated by Δ-mark in the figure. As the electrode tab insulating part 22D of the insulating sheet 20D insulates the electrode tab 12F of the flat-type cell 10F from the electrode tab 11E of the flat-type cell 10E, 4 sheets of the flat-type cells 10C, 10B, 10F and 10E are electrically connected in series by welding a group of the electrode tabs 110B. And as the voltage detecting terminal 24E on the insulating sheet 20E contacts with the electrode tab 12B of the flat-type cell 10B and the voltage detecting terminal 24D on the insulating sheet 20D contacts with the electrode tab 12F of the flat-type cell 10F, voltage of the flat-type cell 10B can be detected by measuring voltage between the voltage detecting terminals 24E and 24D.

In addition, when a group of electrode tabs 110C is subjected to ultrasonic welding (refer to FIG. 2), then the minus side electrode tab 11E of the flat-type cell 10E, and the plus side electrode tab 12D of the flat-type cell 10D located lower next, are welded. The part where ultrasonic welding is applied is the protruding parts of the electrode tab 11E and the electrode tab 12D, indicated by Δ-mark in the figure. As the flat-type cell 10D and the flat-type cell 10C located at the lower next position form a unit, the electrode tabs 11D and 12C thereof are already welded. And the electrode tab insulating part 22B of the insulating sheet 20B insulates the electrode tab 12E of the flat-type cell 10E from the electrode tab 11D of the flat-type cell 10D, and the electrode tab insulating part 22C of the insulating sheet 20C insulates the electrode tab 12D of the flat-type cell 10D from the electrode tab 11C of the flat-type cell 10C, therefore 6 sheets of the flat-type cells 10C, 10B, 10F, 10E, 10D and 10C are electrically connected in series by welding a group of the electrode tabs 110C. In addition, as the voltage detecting terminal 24D on the insulating sheet 20D contacts with the electrode tab 12F of the flat-type cell 10F and the voltage detecting terminal 24B on the insulating sheet 20B contacts with the electrode tab 12E of the flat-type cell 10E, and furthermore the voltage detecting terminal 24C on the insulating sheet 20C contacts with the electrode tab 12D of the flat-type cell 10D, voltage of the flat-type cell 10F can be detected by measuring voltage between the voltage detecting terminals 24D and 24B, and voltage of the flat-type cell 10E can be detected by measuring voltage between the voltage detecting terminals 24B and 24C.

Finally, the welding parts separated at different positions are welded in order. When a group of the electrode tabs 110D (refer to FIG. 2) is subjected to ultrasonic welding, the minus side electrode tab 11C of the flat-type cell 10C, and the plus side electrode tab 12B of the flat-type cell 10B located lower next, are welded. The part where ultrasonic welding is applied is the protruding parts of the electrode tab 11C and the electrode tab 12B, indicated by Δ-mark in the figure. As the flat-type cell 10B and the flat-type cell 10A located at the lower next position form a unit, the electrode tabs 11B and 12A thereof are already welded. In addition, the electrode tab insulating part 22B of the insulating sheet 20B insulates the electrode tab 12C of the flat-type cell 10C from the electrode tab 11B of the flat-type cell 10B, and the electrode tab insulating part 22A of the insulating sheet 20A insulates the electrode tab 12B of the flat-type cell 10B from the electrode tab 11A of the flat-type cell 10A, all of 8 sheets of the flat-type cells 10C, 10B, 10F, 10E, 10D, 10C, 10B and 10A composing the combined battery 100, are electrically connected in series by welding a group of the electrode tabs 110D. In addition, as the voltage detecting terminal 24C on the insulating sheet 20C contacts with the electrode tab 12D of the flat-type cell 10D and the voltage detecting terminal 24B on the insulating sheet 20B contacts with the electrode tab 12C of the flat-type cell 10C, and furthermore the voltage detecting terminal 24A on the insulating sheet 20A contacts with the electrode tab 12B of the flat-type cell 10B, voltage of the flat-type cell 10D can be detected by measuring voltage between the voltage detecting terminals 24C and 24B, and voltage of the flat-type cell 10C can be detected by measuring voltage between the voltage detecting terminals 24B and 24A.

In this connection, though voltage between the flat-type cell 10A located at the bottom, and the flat-type cell 10B located upper next can not be measured in the construction above, voltage between the flat-type cells 10A and 10B can be measured by laminating the insulating sheet 20B under the flat-type cell 10A located at the bottom.

As stated above, according to the method for producing the combined battery according to the present Embodiment, the combined battery 100 can be produced by using 8 sheets of the flat-type cells and the 7 sheets of the insulating sheets, laminating the flat-type cells and the insulating sheets alternatively, and ultrasonic welding the electrode tab groups 110A to 110D, separated at 4 positions. Because the positions to be subjected to ultrasonic welding are dispersed at 4 directions, all of the flat-type cells enable to be welded while in lamination state. Therefore freedom of the head shape of the ultrasonic welding machine becomes greater and automation of welding operation becomes easy. And because ultra sound is used for welding and no mechanical bonding part is present, it is unlikely that contact resistance varies and loosening due to vibration occurs and thus sufficient reliability can be kept in endurance-reliability and maintainability.

In addition, though the insulating sheet needs to be placed between the flat-type cells, once the insulating sheet is laminated, insulation between the electrode tabs can be secured and furthermore because the voltage detecting terminal is bonded, connecting only the voltage detecting terminal to the electrode tab is unnecessary and workability is improved. Furthermore, when the insulating sheet is provided with moderate elasticity and moderate surface friction, which in turn leads to provide moderate pressure to the flat-type cells laminated, and to prevent misalignment of the flat-type cells.

EMBODIMENT 2

Figure 8:
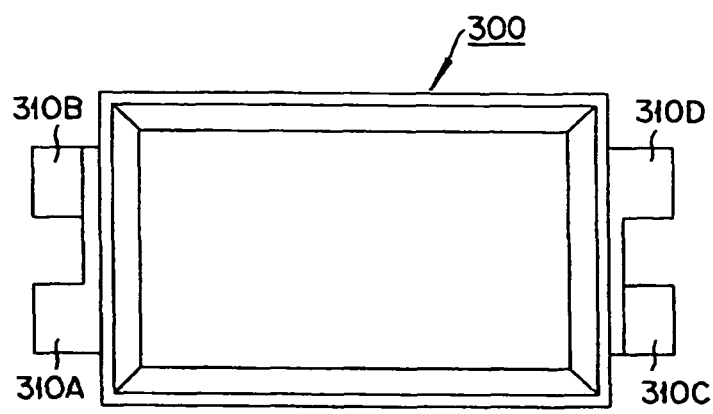
FIG. 8 is an outline view of a combined battery according to Embodiment 2 relevant to the present invention.

FIG. 8 is an outline view of a combined battery according to Embodiment 2 relevant to the present invention. A combined battery 300 according to the present Embodiment is one formed by laminating 12 sheets of flat-type cells in the thickness direction of thereof. Each one of electrode tabs pulled out from both sides of the flat-type cell has a specific shape in each lamination layer position thereof so that welding positions are different each other, when 12 sheets of the flat-type cells are laminated in order. The electrode tabs of the flat-type cells are electrically connected in series by welding with the ultrasonic welding machine 200 shown in FIG. 2. The electrode tabs of the combined battery 300 are arranged so that the protruding parts 310A, 310B, 310C and 310D thereof are separated into 4 directions as shown in FIG. 8 in completely assembled state. In the flat-type cell 300, all of the 12 sheets of flat-type cells are electrically connected in series in completely assembled state.

In the case of mounting the combined battery according to the present Embodiment on a vehicle, the combined batteries are laminated so as to form 2 lamination layers thereof with heat sinks made present inter-the combined batteries, the 2 laminated layers are set in 4 rows and all of the combined batteries are fixed with heat sinks so as to be sandwiched from both sides in the lamination direction thereof. Heat sinks present at both sides in the lamination direction are fixed so as to attract each other with specified force. Therefore specified suppress strength is evenly applied to every flat-type cell.

As stated above, the 8 combined batteries including 2 layers by 4 rows are all connected in series similarly as in Embodiment 1, by directly connecting the electrode tabs themselves which are located in the lamination direction, and by connecting, with bus-bars, the electrode tabs themselves which are adjacently located at the top or the bottom thereof.

When every combined battery is connected in series, 96 sheets of flat-type cells including 12 sheets by 2 layers by 4 rows are all connected in series, and a high voltage of 370 V of 3.85 V/sheet by 96 sheets, can be obtained between the electric terminals 140A and 140B (refer to FIG. 3) of the heat sinks located at one side in the lamination direction.

Next, a method for producing a combined battery according to the present Embodiment will be explained.

Figure 9:
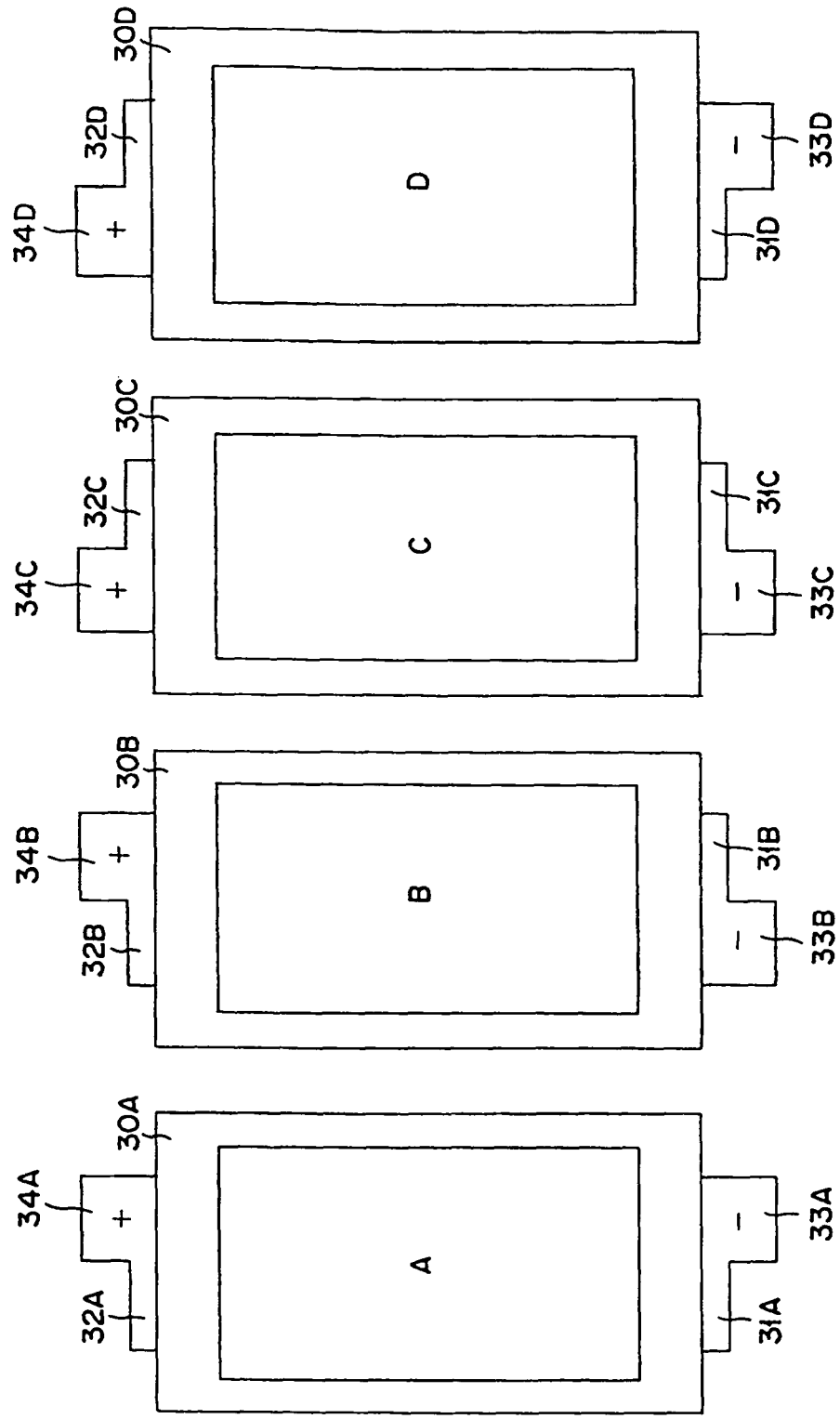
FIG. 9 is a drawing showing flat-type cells required for constructing a combined battery according to Embodiment 2.

The combined battery 300 according to the present Embodiment makes the shape of the electrode tab of each of flat-type cells different according to the position of lamination layer so that welding parts of the electrode tabs are separated into 4 directions. FIG. 9 shows the types of flat-type cells (electrode tab shapes are different) required for constructing the combined battery 300 according to the present Embodiment. While the combined battery 300 is composed of 12 laminated sheets of the flat-type cells, the flat-type cells having 4 types of electrode tab shapes as shown in the Figure, are necessary to separate the welding positions of the electrode tabs into 4 directions.

The A type flat-type cell 30A, has the minus side electrode tab 31A cut off at the left side as viewed from the end thereof, and the plus side electrode tab 32A cut off at the right side as viewed from the end thereof. The B type flat-type cell 30B, has the electrode tabs 31B and 32B of both sides thereof, cut off both at the right side as viewed from each of the ends thereof, and has the protruding parts 33B and 34B at the left side as viewed from each of the ends thereof. The C type flat-type cell 30C, has the minus side electrode tab 31C cut off at the right side as viewed from the end thereof, and the plus side electrode tab 32C cut off at the left side as viewed from the end thereof. The D type flat-type cell 30D, has the electrode tabs 31D and 32D of both sides thereof, cut off both at the left side as viewed from each of the ends thereof, and has the protruding parts 33D and 34D at the right side as viewed from each of the ends thereof.

Types of the flat-type cells to be prepared are described above on the assumption that the flat-type cell can not be laminated by turning inside out thereof. However, if the flat-type cell can be laminated by turning inside out thereof, the flat-type cell 30A turned inside out can commonly be used as the flat-type cell 30C, and the flat-type cell 30B turned inside out can commonly be used as well as the flat-type cell 30D, and in this case preparation of only 2 types of flat-type cells is required.

Figure 10:
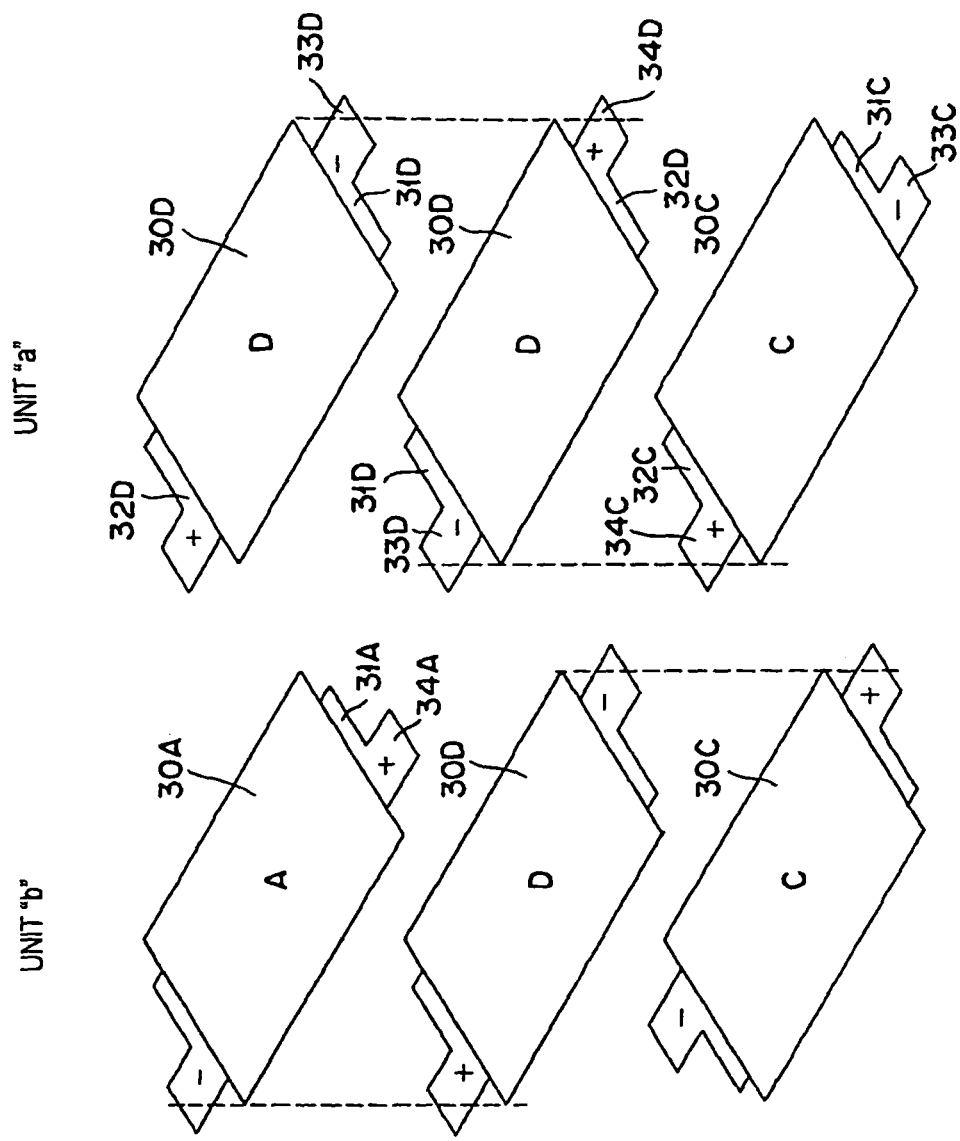
FIG. 10 is a drawing for explaining a production process of a combined battery according to Embodiment 2.
Figure 11:
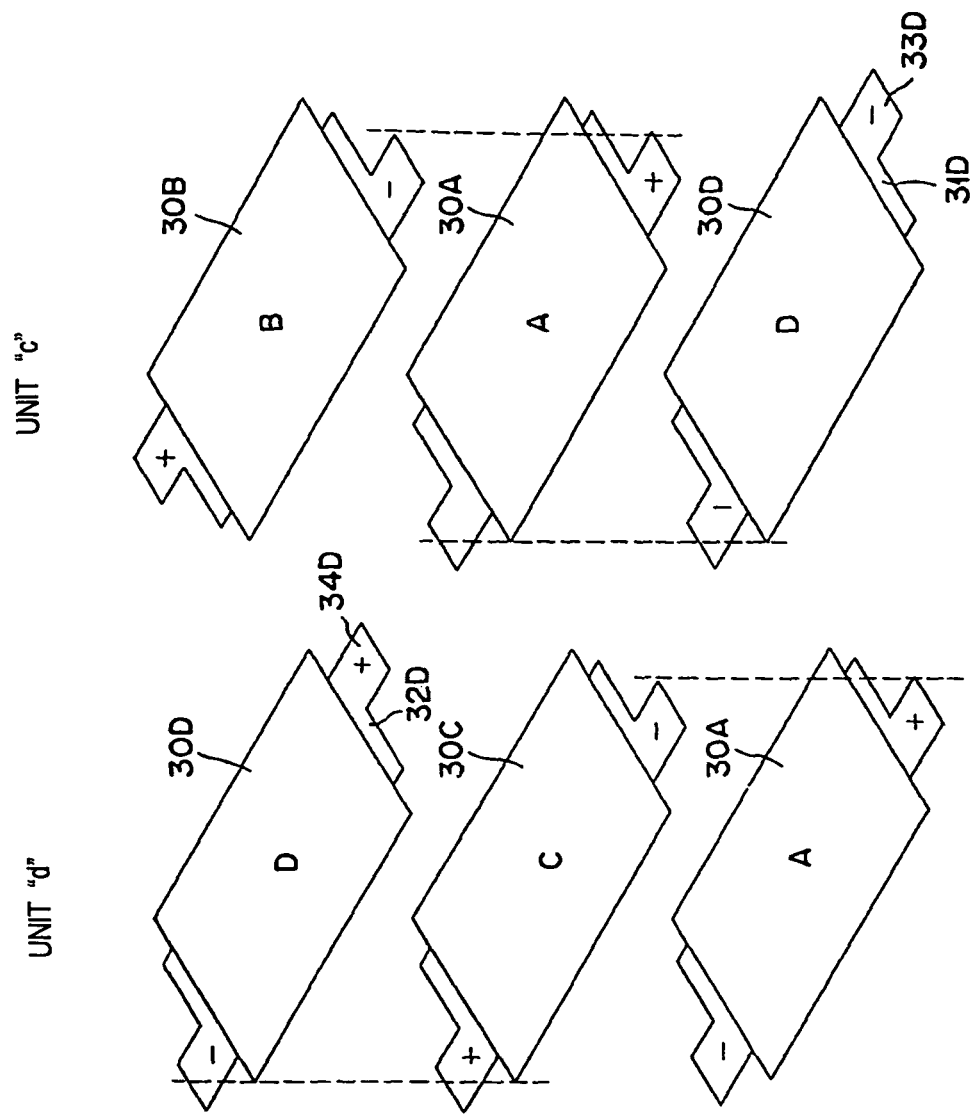
FIG. 11 is a drawing for explaining a production process of a combined battery according to Embodiment 2.
Figure 12:
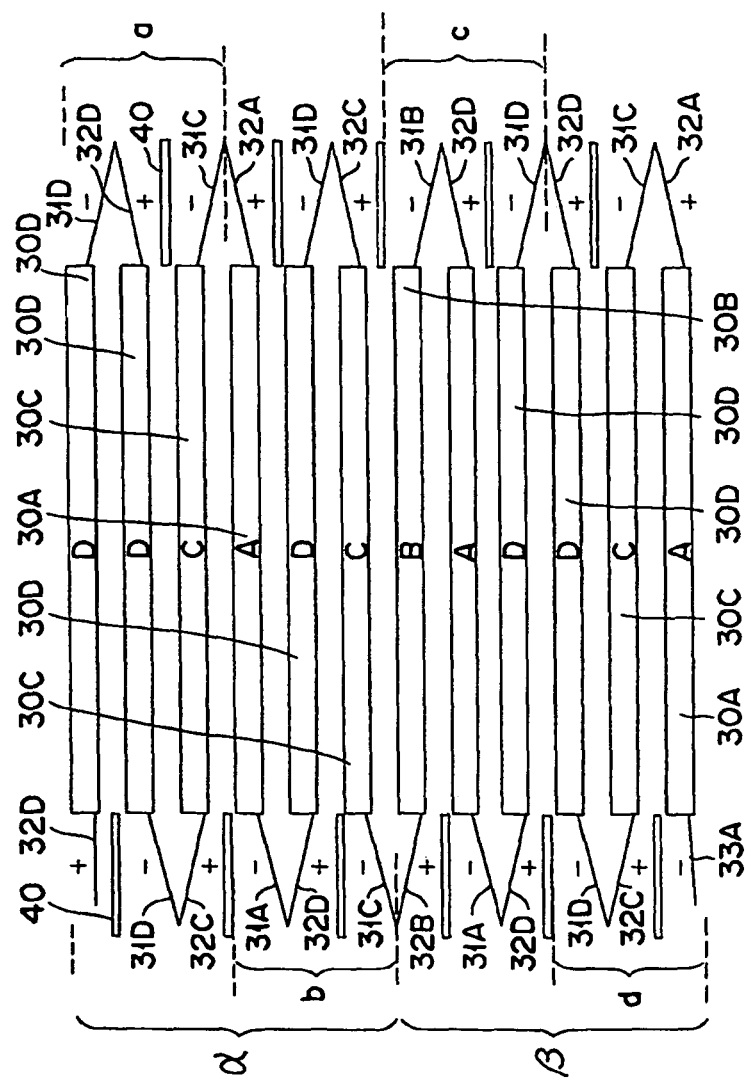
FIG. 12 is a drawing for explaining a production process of a combined battery according to Embodiment 2.

In the case of producing the combined battery according to the present Embodiment, the flat-type cells are arranged as shown in FIG. 10 and FIG. 11, and laminated as shown in FIG. 12. Specifically, from the bottom to the top, the flat-type cells 30A, 30C, 30D, 30D, 30A, 30B, 30C, 30D, 30A, 30C, 30D and 30D shown in FIG. 8 are laminated in order.

Before laminated, a unit (the first unit) is produced in advance by combining the flat-type cells including 3 sheets therein shown in FIG. 10 and FIG. 11, and by ultrasonic welding the electrode tabs themselves. Namely, as shown in FIG. 10, the unit "a" composed of the combination of the flat-type cells 30D, 30D and 30C, and the unit "b" composed of the combination of the flat-type cells 30A, 30D and 30C, as shown in FIG. 11, the unit "c" composed of the combination of the flat-type cells 30B, 30A and 30D, and the unit "d" composed of the combination of the flat-type cells 30D, 30C and 30A, totally 4 units, are produced in advance.

In the case of producing each of the units, the electrode tabs connected by the dotted line shown in FIGS. 10 and 11, are welded themselves with the ultrasonic welding machine 200 shown in FIG. 2. For example, in FIG. 10, in the case of producing the unit "a" composed of the combination of the flat-type cells 30D, 30D and 30C, first the protruding part 34C of the plus side electrode tab 32C of the flat-type cell 30C located at the bottom, and the protruding part 33D of the minus side electrode tab 31D of the flat-type cell 30D located upper next are welded, next the protruding part 33D of the minus side electrode tab 31D of the flat-type cell 30D located at the top, and the protruding part 34D of the plus side electrode tab 32D of the flat-type cell 30D located lower next, are welded. If welding is performed in order described above, because welding can be performed at entirely different positions, welding operation is easy.

To prevent the plus side electrode tab 32D of the flat-type cell 30D located at the top, from electrically connecting with the minus side electrode tab 31D of the flat-type cell 30D located at the lower part, the insulating body 40, as an insulation means, is made present inter-the electrode tabs 32D and 31D as shown in FIG. 12. As the insulating body 40, a sheet-like one can be accepted or an insulating tape can be bonded on the lower face (in the direction in the Figure) of the electrode tab 32D as well. Similarly, to prevent the minus side electrode tab 31C of the flat-type cell 30C located at the bottom, from electrically connecting with the plus side electrode tab 32D of the flat-type cell 30D located upper next, the insulating body 40 is made present inter-the electrode tabs 32D and 31C. The remaining 3 units shown in FIGS. 10 and 11 are produced in the same way as described above. In addition, in FIG. 12, the drawings with the same shape as the insulating body 40 are all insulating bodies to insulate between the electrode tabs.

Next, the unit α (the second unit) is produced by welding the unit "a" and the unit "b" as shown in FIG. 12. As shown in FIG. 10, welding of the unit "a" and the unit "b" is performed by welding the protruding part 33C of the electrode tab 31C of the flat-type cell 30C located at the bottom of the unit "a", and the protruding part 34A of the electrode tab 31A of the flat-type cell 30A located at the top of the unit "b". Furthermore, the unit β is produced by welding the unit "c" and the unit "d".

As shown in FIG. 11, welding of the unit "c" and the unit "d" is performed by welding the protruding part 33D of the electrode tab 31D of the flat-type cell 30D located at the bottom of the unit "c", and the protruding part 34D of the electrode tab 32D of the flat-type cell 30D located at the top of the unit "d". When welding of the units is performed as above, because the protruding parts to be object of welding are located at the positions not interrupted at all by other parts, welding operation is easy.

Finally, the combined battery according to the present Embodiment is produced by welding the unit α and the unit β. Welding of the unit α and the unit β is performed, as shown in FIG. 12, by welding the protruding part 33C of the electrode tab 31C of the flat-type cell 30C located at the bottom of the unit α, and the protruding part 34B of the electrode tab 32B of the flat-type cell 30B located at the top of the unit β. When welding of the unit α and the unit β is performed as above, because the protruding parts to be object of welding are located at the positions not interrupted at all by other parts, welding operation is easy.

As above, the combined battery according to the present Embodiment is formed by producing the units "a", "b", "c", and "d", then producing the unit α by welding the units "a" and "b", and the unit β by welding the units "c" and "d", and finally producing the combined battery by welding the units α and β so as to form a combined battery, and because welding of all the units can be performed at the positions not interrupted by other electrode tabs, welding operation is easy. Accordingly, freedom of the head shape of the ultrasonic welding machine becomes greater and automation of welding operation becomes easy. And because ultra sound is used for welding and no mechanical bonding part is present, it is unlikely that contact resistance varies or loosening due to vibration occurs, and thus sufficient reliability can be kept in endurance-reliability and maintainability.

Figure 13:
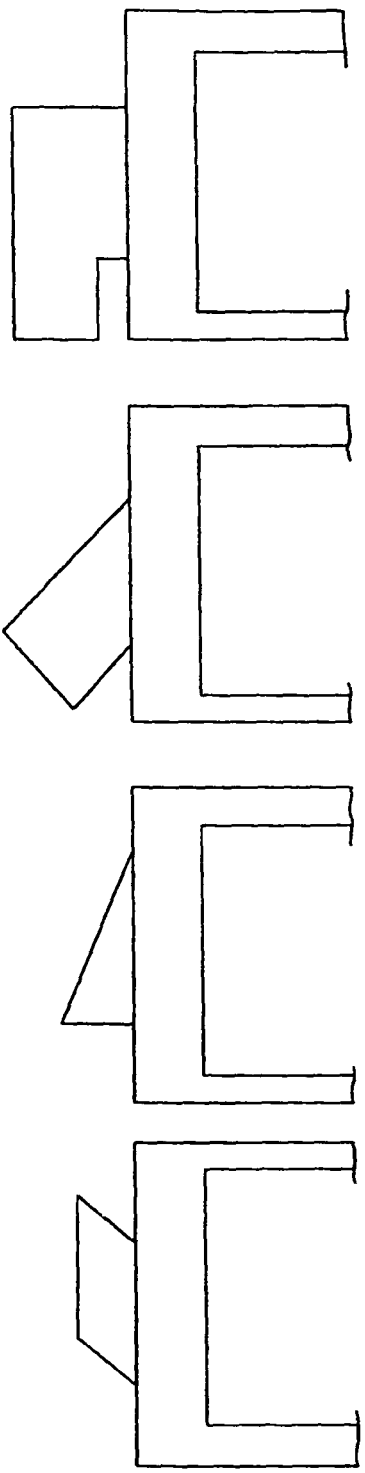
FIG. 13 is a drawing showing other Embodiments of a flat-type cell required for constructing a combined battery according to Embodiment 2.
Figure 14:
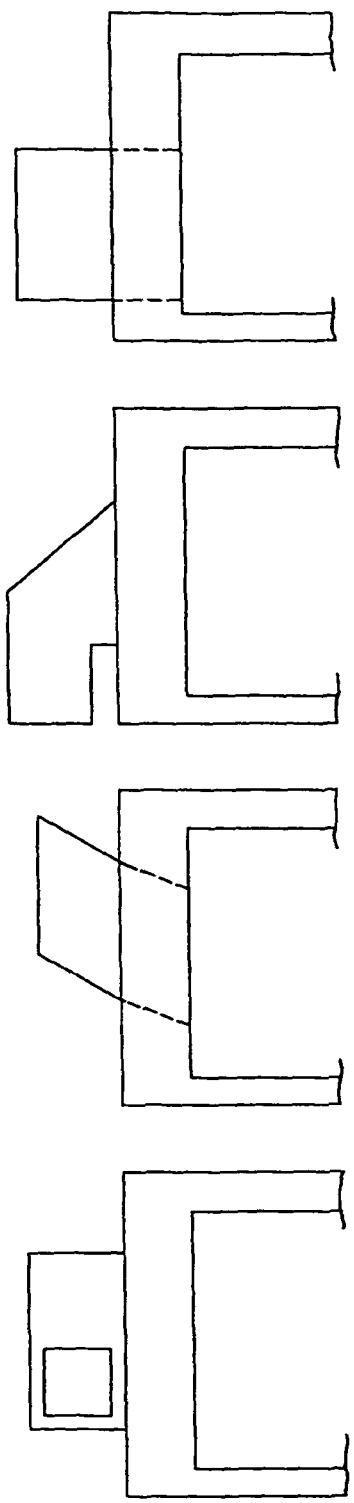
FIG. 14 is a drawing showing other Embodiments of a flat-type cell required for constructing a combined battery according to Embodiment 2.
Figure 15:
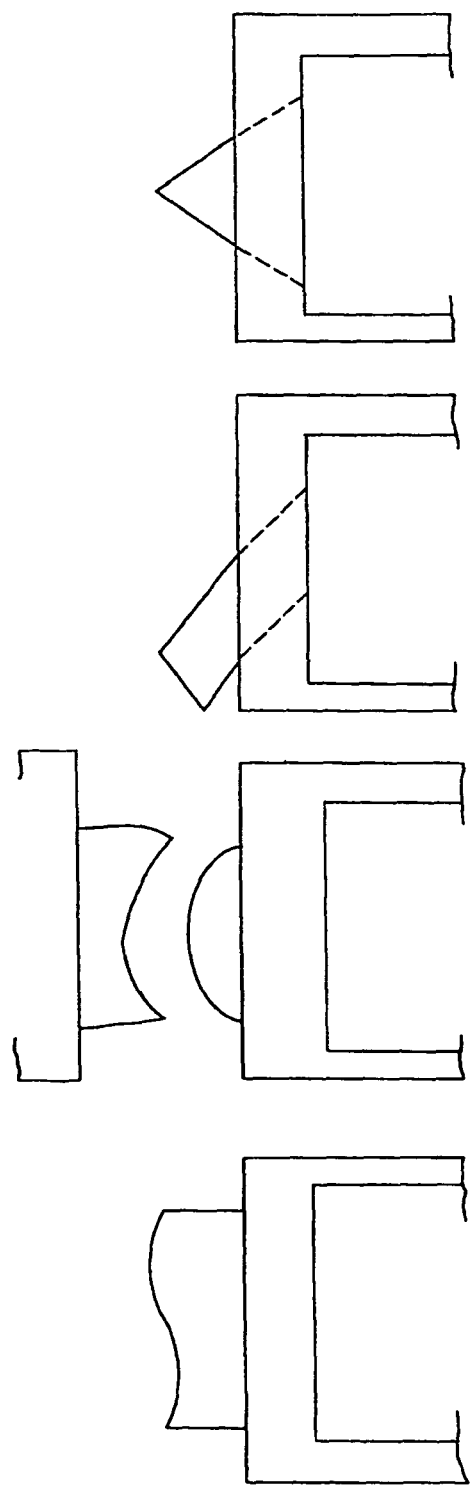
FIG. 15 is a drawing showing other Embodiments of a flat-type cell required for constructing a combined battery according to Embodiment 2.
Figure 16:
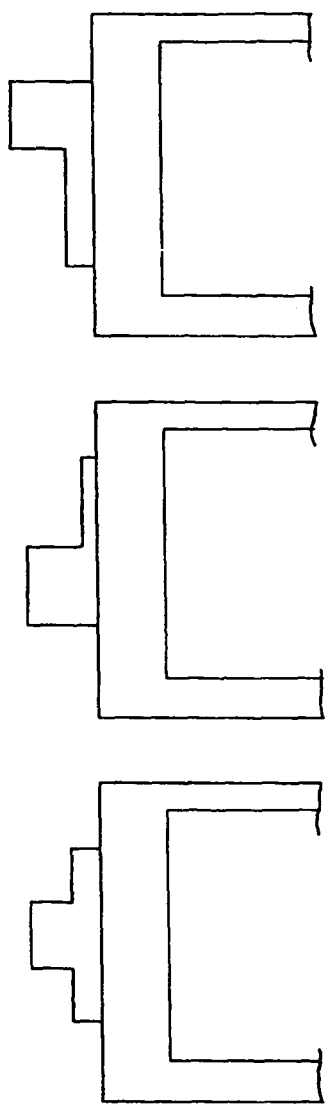
FIG. 16 is a drawing showing other Embodiments of a flat-type cell required for constructing a combined battery according to Embodiment 2.

FIGS. 13 to 16 show other Embodiments of the flat-type cells required for constructing the combined battery according to the present invention. In Embodiment 1, the shape of the electrode tab is designed to be L-character and extending into 2 directions with newly adding the protruding part to the electrode tab of an ordinary flat-type cell. And in Embodiment 2, the shape of the electrode tab is designed to be L-character and extending into 2 directions by cutting off a part of the electrode tab of an ordinary flat-type cell. In FIGS. 13 to 15, the shapes extending into 2 directions, and in FIG. 16, the shapes extending into 3 directions are differently achieved by variously changing the shapes of the electrode tabs. By combining any of the shapes shown in these Figures, electrode tabs are capable of being welded at different positions of an already assembled battery or to be welded at different positions during steps for assembling a combined battery.

EMBODIMENT 3

Figure 17:
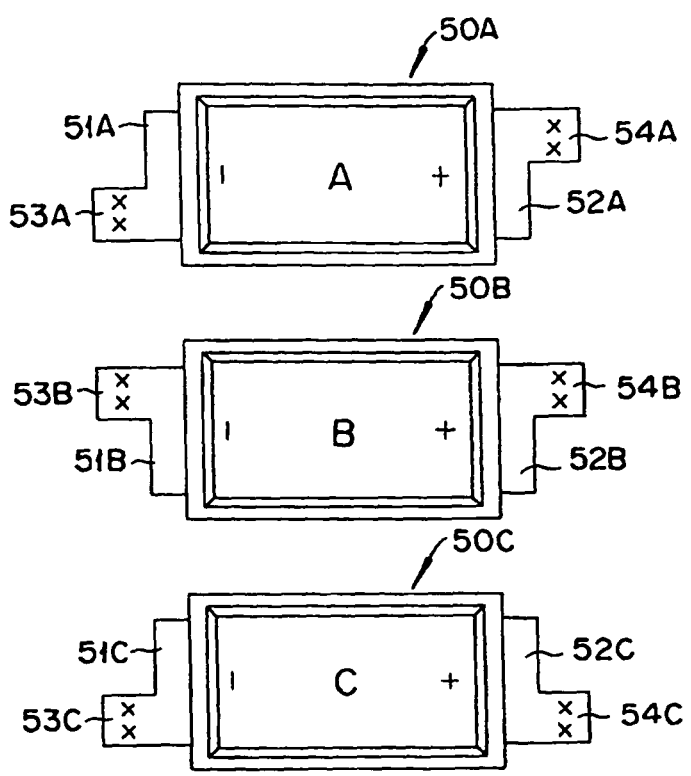
FIG. 17 is a drawing showing flat-type cells required for constructing a combined battery according to Embodiment 3.

A combined battery according to the present Embodiment is one formed by laminating 8 sheets of flat-type cells in the thickness direction thereof in the prescribed combination of the flat-type cells having 3 types of electrode tab shapes as shown in FIG. 17. Each one of electrode tabs pulled out from both sides of the flat-type cell has a specific shape in each lamination layer position thereof so that welding positions may be in different positions when 8 sheets of the flat-type cells are laminated in order. The electrode tabs of the flat-type cells are electrically connected in series by welding with the ultrasonic welding machine 200 shown in FIG. 2. The electrode tabs of the combined battery are arranged so that the protruding parts thereof are separated into 4 directions in the same way as FIG. 8 shown in Embodiment 2 in completely assembled state. In the combined battery, all of the 8 sheets of flat-type cells are electrically connected in series, in completely assembled state.

In addition, in the present Embodiment as well, because a method for mounting the combined battery already assembled, on a vehicle and a method for connecting the combined batteries themselves are the same as those in Embodiment 2, the explanation thereof is omitted.

Next, a method for producing the combined battery according to the present Embodiment will be explained.

The combined battery according to the present Embodiment makes the shapes of the electrode tab of each of flat-type cells different according to the position of lamination layer so that welding parts of the electrode tabs are separated into 4 directions. FIG. 17 shows the types of flat-type cells (electrode tab shapes are different) required for constructing the combined battery according to the present Embodiment. While the combined battery is composed of 8 laminated sheets of flat-type cells, the flat-type cells having 3 types of electrode tab shapes as shown in the Figure are used to separate welding positions of the electrode tabs into 4 directions in the present Embodiment.

The A type flat-type cell 50A has the minus side electrode tab 51A and the plus side electrode tab 52A, cut off both at the left side as viewed from each of the ends thereof, and has the protruding parts 53A and 54A at the right side as viewed from each of the ends thereof. The B type flat-type cell 50B has the minus side electrode tab 51B cut off at the right side as viewed from the end thereof, and the plus side electrode tab 52B cut off at the left side as viewed from the end thereof, and has the protruding part 53B at the left side and the protruding part 53D at the right side. The C type flat-type cell 50C has the minus side electrode tab 51C cut off at the left side as viewed from the end thereof and the plus side electrode tab 52C cut off at the right side as viewed from the end thereof, and has the protruding part 53C at the right side and the protruding part 54C at the left side.

Figure 18:
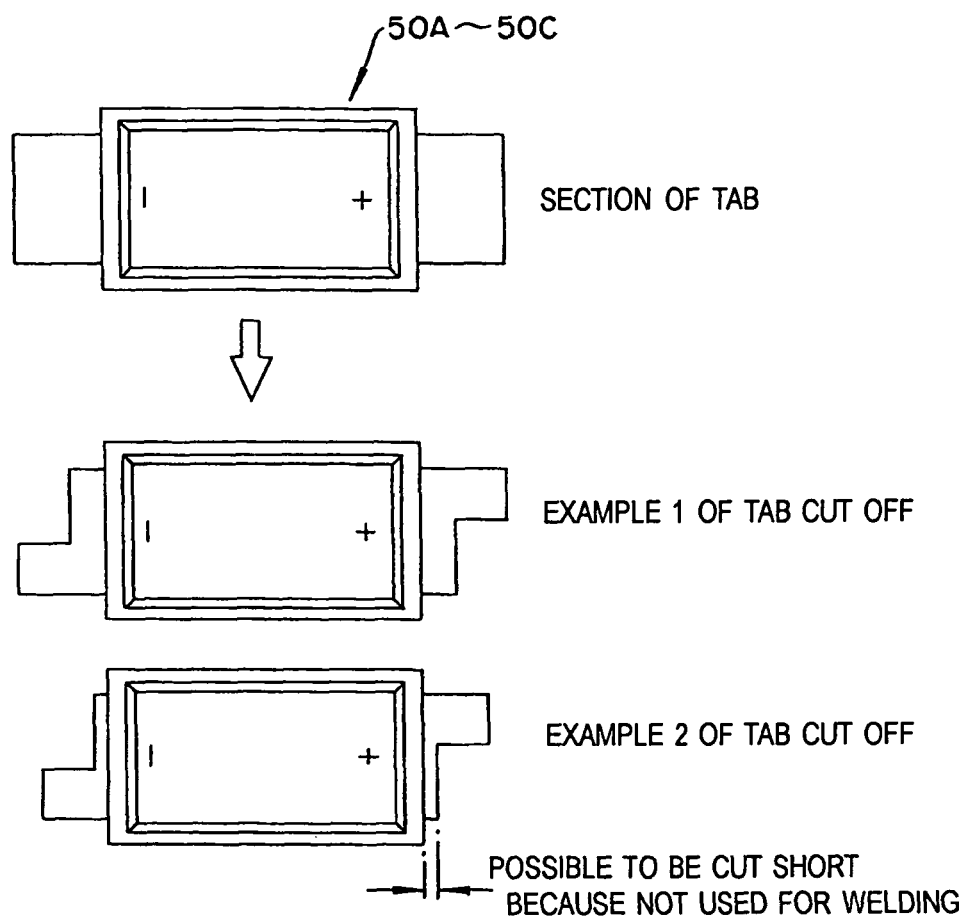
FIG. 18 is a drawing showing flat-type cells required for constructing a combined battery according to Embodiment 3.

As shown in FIG. 18, the flat-type cells 50A to 50C have the electrode tabs rectangular in shape (before a tab is cut off). Three types of the flat-type cells 50A to 50C, as shown in FIG. 17, are produced by cutting a part of the electrode tab. While various methods for cutting thereof can be found out, as shown in FIG. 18, the size of the combined battery in the length direction can be compact by cutting the entire tab including a part not used for welding to be short (example 2 of tab cut off), instead of simply cutting a part of an electrode tab (example 1 of tab cut off).

Figure 19:
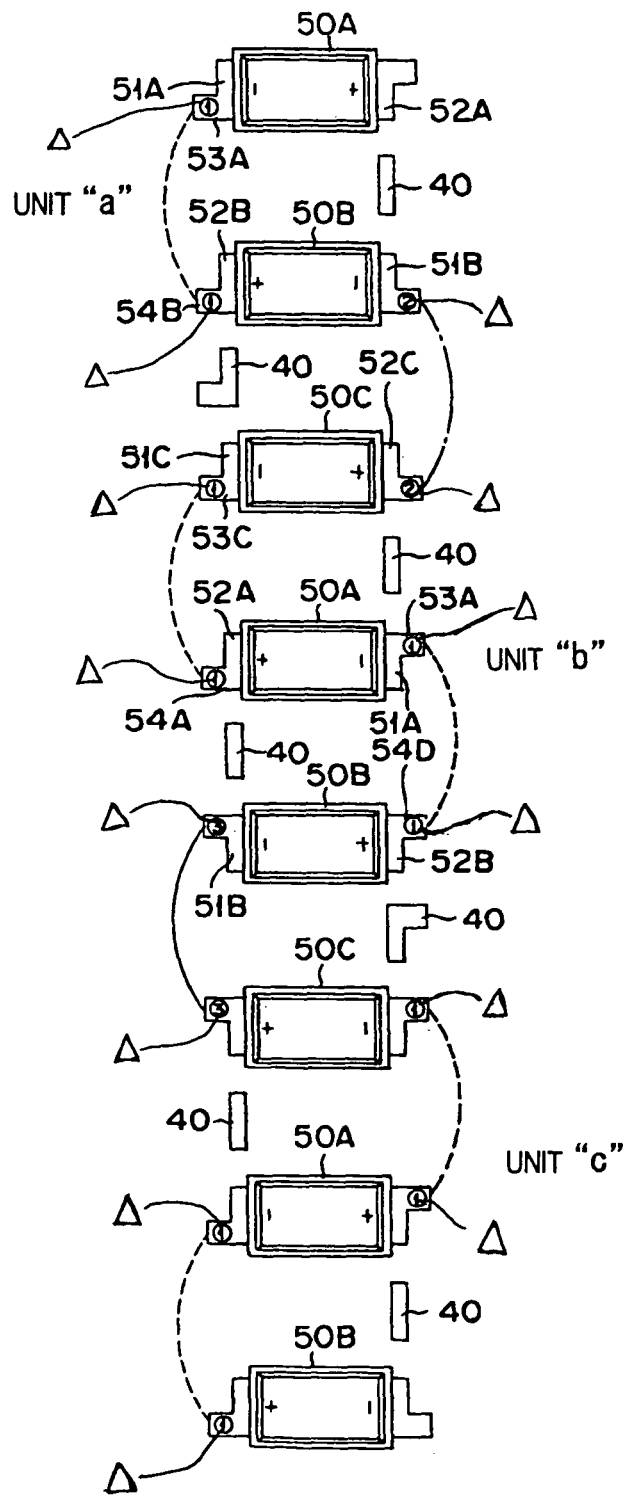
FIG. 19 is a drawing for explaining a production process of a combined battery according to Embodiment 3.
Figure 20:
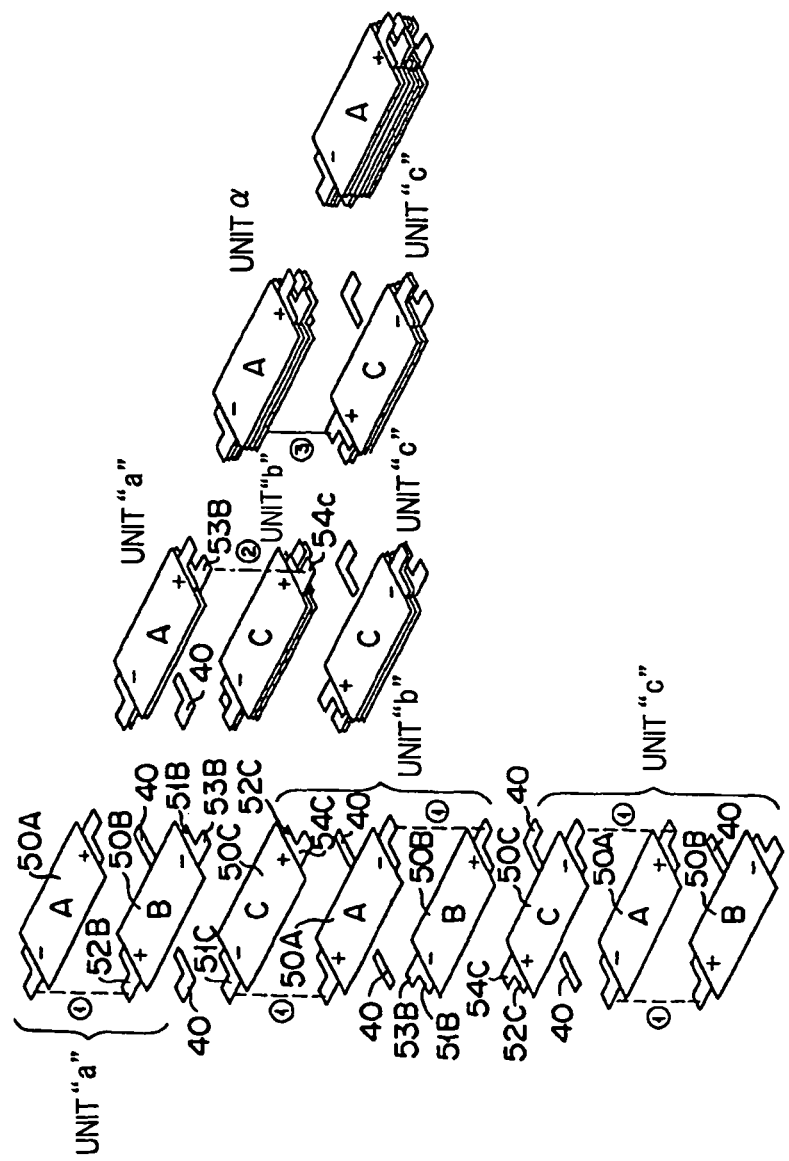
FIG. 20 is a drawing for explaining a production process of a combined battery according to Embodiment 3.

In the case of producing the combined battery according to the present Embodiment, the flat-type cells are arranged as shown in FIG. 19, and laminated as shown in FIG. 20. Specifically, from the top to the bottom, the flat-type cells 50A, 50B, 50C, 50A, 50B, 50C, 50A, and 50B shown in FIG. 17, are laminated in order.

Before laminated, units (the first unit) are produced in advance by combining the flat-type cells themselves indicated by the dotted line in FIG. 19, and by ultrasonic welding the prescribed electrode tabs themselves. Namely, as shown in FIG. 19, the unit "a" composed of the combination of the flat-type cells 50A and 50B, and the unit "b" and the unit "c" composed of the combination of the flat-type cells 50C, 50A and 50B, totally 3 units, are produced in advance.

When each of the units is produced, the electrode tabs connected by the dotted line shown in FIGS. 19 and 20 (the left side), are welded themselves with the ultrasonic welding machine 200 shown in FIG. 2. For example, in FIG. 19, in the case of producing the unit "a" composed of the combination of the flat-type cells 50A and 50B, first the protruding part 54B of the plus side electrode tab 52B of the flat-type cell 50B located at the lower part, and the protruding part 53A of the minus side electrode tab 51A of the flat-type cell 50A located upper next are welded. And in the case of producing the unit "b" and the unit "c" composed of the combination of the flat-type cells 50C, 50A and 50B, first the protruding part 54B of the plus side electrode tab 52B of the flat-type cell 50B located at the lowest part, and the protruding part 53A of the minus side electrode tab 51A of the flat-type cell 50A located upper next are welded, then the protruding part 53C of the minus side electrode tab 51C of the flat-type cell 50C located at the upper part of the flat-type cell 50A, and the protruding part 54A of the plus side electrode tab 52A of the flat-type cell 50A are welded. When welding is performed in order described above, because welding can be performed at entirely different positions, welding operation is easy.

When each of these units is produced, to prevent the plus side electrode tab 52A of the flat-type cell 50A located at the upper part, from electrically connecting with the minus side electrode tab 51B of the flat-type cell 50B located at the lower part thereof, the insulating body 40, as an insulation means with a prescribed shape, is made present between the electrode tab 52A and the electrode tab 51B. As the insulating body 40, a sheet-like one can be accepted or an insulating tape can be bonded on the lower surface (in the direction in the Figure) of the electrode tab 52A as well. The insulating body 40 with a prescribed shape is also made present inter-the electrode tabs 51A and 52C of the flat-type cells 50A and 50C composed of the unit "b" and the unit "c", and inter-the electrode tabs 52A and 51B of the flat-type cells 50A and 50B.

Next, the unit α (the second unit) is produced by welding the unit "a" and the unit "b" as shown in FIG. 20. As shown in the Figure, welding of the unit "a" and the unit "b" is performed by welding the protruding part 53B of the electrode tab 51B of the flat-type cell 50B located at the bottom of the unit "a", and the protruding part 54C of the electrode tab 52C of the flat-type cell 50C located at the top of the unit "b". Of course, when the units "a" and "b" are welded, the insulating body 40 is made present inter-the electrode tabs for preventing electrical connection between electrode tabs (52B and 51C) of the side not to be welded. When welding of the units is performed as above, because the protruding parts to be object of welding are located at the positions not interrupted at all by other parts, welding operation is easy.

Finally, the combined battery according to the present Embodiment is produced by welding the unit α and the unit "c". Welding of the unit α and the unit "c" is performed, as shown in FIG. 20, by welding the protruding part 53B of the electrode tab 51B of the flat-type cell 50B located at the bottom of the unit α, and the protruding part 54C of the electrode tab 52C of the flat-type cell 50C located at the top of the unit "c". When welding of the unit α and the unit "c" is performed as above, because the protruding parts to be object of welding are located at the positions not interrupted at all by other parts, welding operation is easy.

As above, the combined battery according to the present Embodiment is formed by producing the units "a", "b", and "c", then producing the unit α by welding the units "a" and "b", and producing the combined battery by welding the units α and the unit "c", and because welding of all the units is performed at the positions not interrupted by other electrode tabs, welding operation is easy. Accordingly, freedom of the head shape of the ultrasonic welding machine becomes greater and automation of welding operation becomes easy.

In addition, because ultra sound is used for welding and no mechanical bonding part is present, generation of contact resistance variation or loosening due to vibration is unlikely, and thus sufficient reliability can be kept in endurance-reliability and maintainability.

Figure 21:
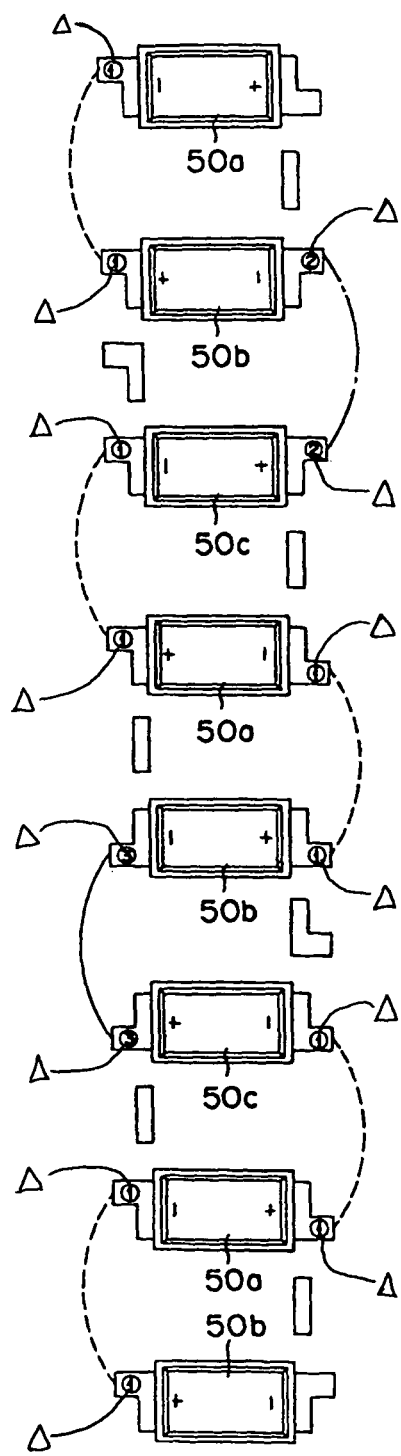
FIG. 21 is a drawing for explaining another production process of a combined battery according to Embodiment 3.

Furthermore, for producing the combined battery according to the steps described above, the flat-type cells with the electrode tab shape as shown in FIG. 21, may be laminated. The positions of the protruding parts of the electrode tabs of the flat-type cells shown in FIG. 21 are all inverted of those shown in FIG. 20. That is, in the flat-type cell 50a, the position of the protruding part thereof is exactly opposite of that in the flat-type cell 50A shown in FIG. 17, and similarly in the flat-type cells 50b and 50c, the positions of the protruding parts thereof are exactly opposite of those in the flat-type cells 50B and 50C. Even if the flat-type cells 50a to 50c are used, the combined battery can easily be produced by welding while producing the units in order, in the same steps as the producing steps shown in FIG. 20.

EMBODIMENT 4

Figure 22:
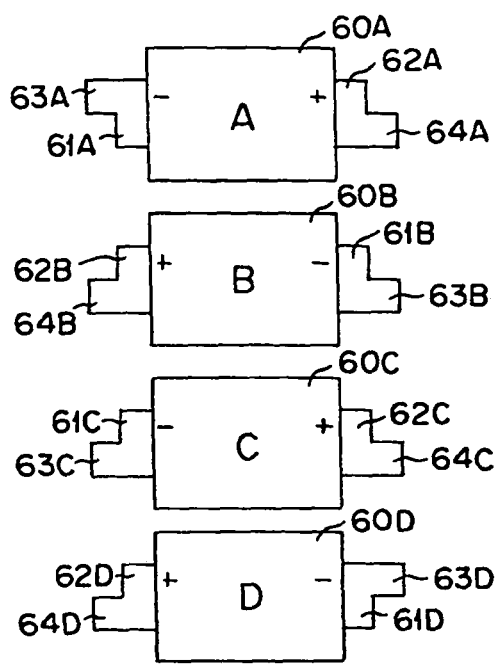
FIG. 22 is a drawing showing flat-type cells required for constructing a combined battery according to Embodiment 4.

A combined battery according to the present Embodiment is one formed by laminating 8 sheets of flat-type cells in the thickness direction thereof in the prescribed combination of the flat-type cells having 4 types of electrode tab shapes as shown in FIG. 22. Each one of electrode tabs pulled out from both sides of the flat-type cells has a specific shape in each lamination layer position thereof so that welding positions are different when 8 sheets of the flat-type cells are laminated in order. The electrode tabs of the flat-type cells are electrically connected in series by welding with the ultrasonic welding machine 200 shown in FIG. 2. The electrode tabs of the combined battery are arranged so that the protruding parts thereof are separated into 4 directions in the same way as FIG. 8 shown in Embodiment 2 in completely assembled state. In the combined battery, all of the 8 sheets of flat-type cells are electrically connected in series, in completely assembled state.

In addition, in the present Embodiment as well, because a method for mounting the combined battery already assembled, on a vehicle and a method for connecting the combined batteries themselves, are the same as those in Embodiment 2, the explanation thereof is omitted.

Next, a method for producing the combined battery according to the present Embodiment will be explained.

The combined battery according to the present Embodiment makes the shapes of the electrode tab of each of flat-type cells different according to the position of lamination layer so that welding parts of the electrode tabs are separated into 4 directions. FIG. 22 shows the types of flat-type cells (electrode tab shapes are different) required for constructing the combined battery according to the present Embodiment. While the combined battery is composed of 8 laminated sheets of flat-type cells, the flat-type cells having 4 types of electrode tab shapes as shown in the figure, are used to separate the welding positions of the electrode tabs into 4 directions in the present Embodiment.

The A type flat-type cell 60A has the minus side electrode tab 61A and the plus side electrode tab 62A, cut off both at the right side as viewed from each of the ends thereof, and has the protruding parts 63A and 64A at the left side as viewed from each of the ends thereof. The B type flat-type cell 60B has the minus side electrode tab 61B cut off at the right side as viewed from the end thereof, and the plus side electrode tab 62B cut off at the left side as viewed from the end thereof, and has the protruding part 63B at the left side as viewed from the end thereof and the protruding part 63 B at the right side. The C type flat-type cell 60C has the minus side electrode tab 61C cut off at the left side as viewed from the end thereof, and the plus side electrode tab 62C cut off at the right side as viewed from the end thereof, and has the protruding part 63C at the right side and the protruding part 64C at the left side. The D type flat-type cell 60D has the minus side electrode tab 61D cut off at the left side as viewed from the end thereof, and the plus side electrode tab 62D cut off at the left side as viewed from the end thereof, and has the protruding parts 63D and 64D at the right side as viewed from each of the ends thereof.

Figure 23:
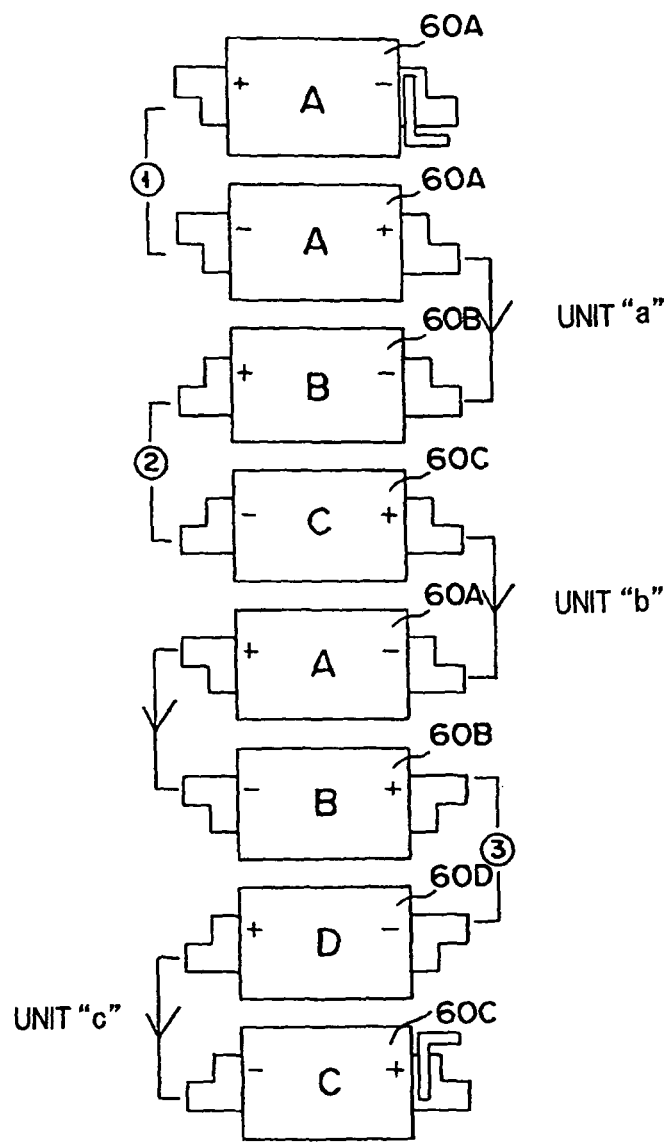
FIG. 23 is a drawing for explaining a production process of a combined battery according to Embodiment 4.

When the combined battery according to the present Embodiment is produced, the flat-type cells are arranged and laminated as shown in FIG. 23. Specifically, from the top to the bottom, the flat-type cells 60A, 60A, 60B, 60C, 60A, 60B, 60D, and 60C shown in FIG. 22 are laminated in order.

Before laminated, units (the first unit) are produced in advance by combining the flat-type cells themselves indicated by V-mark in FIG. 23, and by ultrasonic welding the prescribed electrode tabs themselves. Namely, as shown in FIG. 23, the unit "a" composed of a combination of the flat-type cells 60A and 60B, and the unit "b" composed of a combination of the flat-type cells 60C, 60A and 60B, and the unit "c" composed of a combination of the flat-type cells 60D and 60C, totally 3 units, are produced in advance. Naturally, similarly as in Embodiments 1 to 3, the insulating body is made present inter-the flat-type cells requiring insulation when these units are produced.

In the case of producing each of the units, the electrode tabs connected by the V-mark shown in FIG. 23, are welded themselves with the ultrasonic welding machine 200 shown in FIG. 2. Because the specific method for the welding is the same as in the above-described Embodiments 1 to 3, the detailed explanation thereof is omitted. When each of the units is produced, because welding can be performed at entirely different positions, welding operation is easy.

Then, as shown in FIG. 23, the electrode tabs of the unit "a" and that of the flat-type cell 60A located at upper next thereof, being connected by the solid line, are welded themselves, and next the electrode tabs of the flat-type cell 60B located at the bottom of the unit "a" and the flat-type cell 60C located at the top of the unit "b", being connected by the solid line, are welded themselves, and finally the electrode tabs of the flat-type cell 60B located at the bottom of the unit "b" and the flat-type cell 60D located at the top of the unit "c", being connected by the solid line, are welded themselves. Similarly as in Embodiments 1 to 3, the insulating body is made present inter-the flat-type cells requiring insulation when such welding is performed. When welding of the units is performed as above, because the protruding parts to be object of welding are located at the positions not interrupted at all by other parts, welding operation is easy.

As above, the combined battery according to the present Embodiment is formed by producing the units "a", "b" and "c", then welding the flat-type cell 60A and the unit "a", welding the units "a" and "b", and further welding the unit "b" and the unit "c" so as to form the combined battery, and because welding of all the units is performed at the positions not interrupted by other electrode tabs, welding operation is easy. Accordingly, freedom of the head shape of the ultrasonic welding machine becomes greater and automation of welding operation becomes easy. In addition, because ultra sound is used for welding and no mechanical bonding part is present, generation of contact resistance variation or loosening due to vibration is unlikely, and thus sufficient reliability can be kept in endurance-reliability and maintainability.

EMBODIMENT 5

Figure 24:
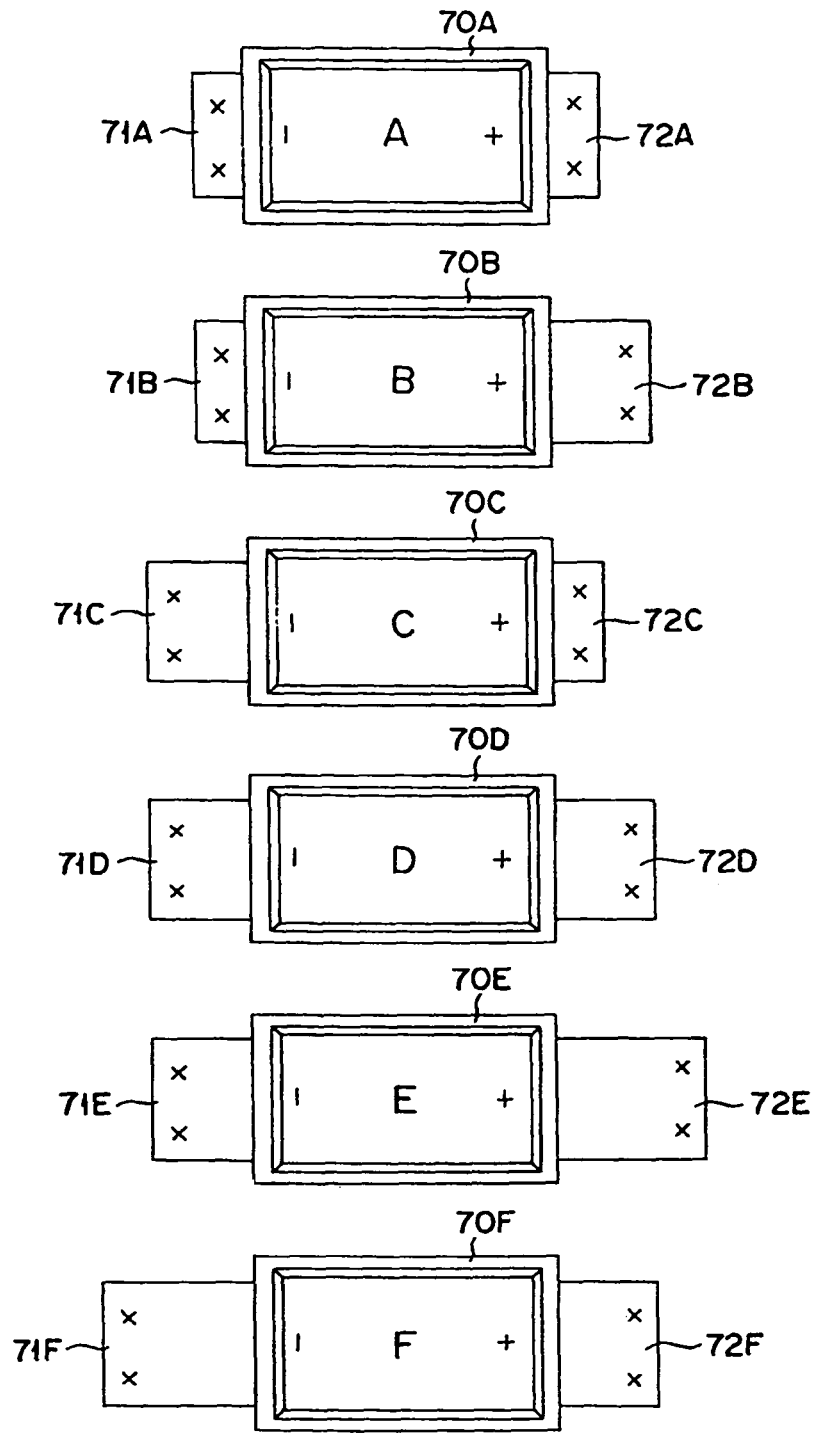
FIG. 24 is a drawing showing flat-type cells required for constructing a combined battery according to Embodiment 5.

A combined battery according to the present Embodiment is one formed by laminating 8 sheets of flat-type cells in the thickness direction thereof in the prescribed combination of 6 types of the flat-type cells having a combination of different length of the electrode tabs as shown in FIG. 24. Each one of the electrode tabs pulled out from both sides of the flat-type cell has a specific length in each lamination layer position thereof so that welding positions are different each other when 8 sheets of the flat-type cells are laminated in order. The electrode tabs of the flat-type cells are electrically connected in series by welding with the ultrasonic welding machine 200 shown in FIG. 2. The electrode tabs of the combined battery are separated into 3 types in length so that the welding can be performed in order, from a short one to a long one during assembling process. In the combined battery, all of the 8 sheets of flat-type cells are electrically connected in series in completely assembled state.

In addition, in the present Embodiment as well, because a method for mounting the combined battery already assembled, on a vehicle and a method for connecting the combined batteries themselves, are the same as those in Embodiment 2, the explanation thereof is omitted.

Next, a method for producing the combined battery according to the present Embodiment will be explained.

The combined battery according to the present Embodiment makes the combination of electrode tab length of each of flat-type cells, different according to the position of lamination layer so that welding parts of the electrode tabs are separated into 3 positions in the length direction. FIG. 24 shows the types of the flat-type cells (electrode tab length are different) required for constructing the combined battery according to the present Embodiment. While the combined battery is composed of 8 laminated sheets of the flat-type cells, 6 types of the flat-type cells with a combination of different length as shown in the Figure are used to separate the welding positions of the electrode tabs into 3 places in the length direction in the present Embodiment.

In the A type flat-type cell 70A, the length of the minus side electrode tab 71A and the plus side electrode tab 72A are made shorter than that of other flat-type cells. The B type flat-type cell 70B has the length of the minus side electrode tab 71B being the same as that of the minus side electrode tab 71A of the A type, and the length of the plus side electrode tab 72B longer than that of the plus side electrode tab 72A of the A type. The C type flat-type cell 70C has the length of the minus side electrode tab 71C being the same as that of the plus side electrode tab 72B of the B type, and the length of the plus side electrode tab 72C being the same as that of the minus side electrode tab 71B of the B type. The length of the minus side electrode tab 71D and the plus side electrode tab 72D of the D type, are the same as that of the plus side electrode tab 72B of the B type. The length of the minus side electrode tab 71E of the E type is the same as that of the plus side electrode tab 72B of the B type and the plus side electrode tab 72E is longer than that of the electrode tabs of any other types. The F type flat-type cell 70F has the length of the minus side electrode tab 71F being the same as that of the plus side electrode tab 72E of the E type and the length of the plus side electrode tab 72F being the same as that of the plus side electrode tab 72B of the B type.

Figure 25:
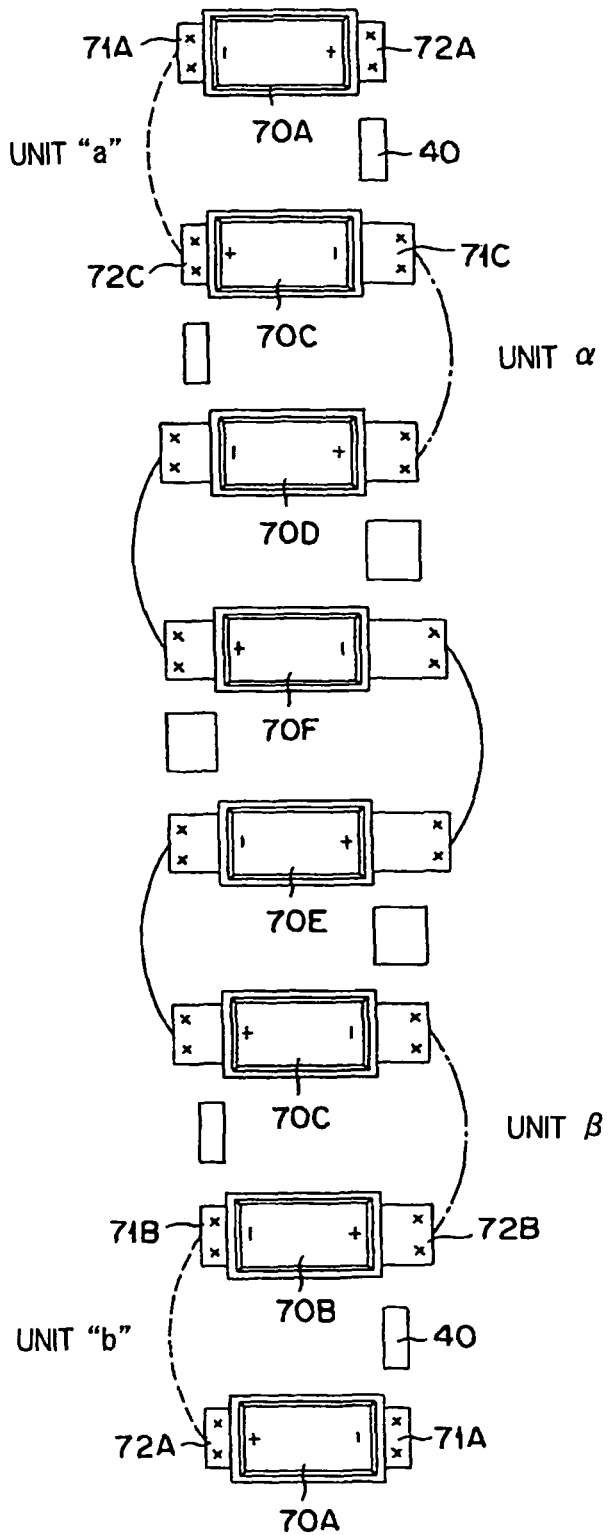
FIG. 25 is a drawing for explaining a production process of a combined battery according to Embodiment 5.
Figure 26:
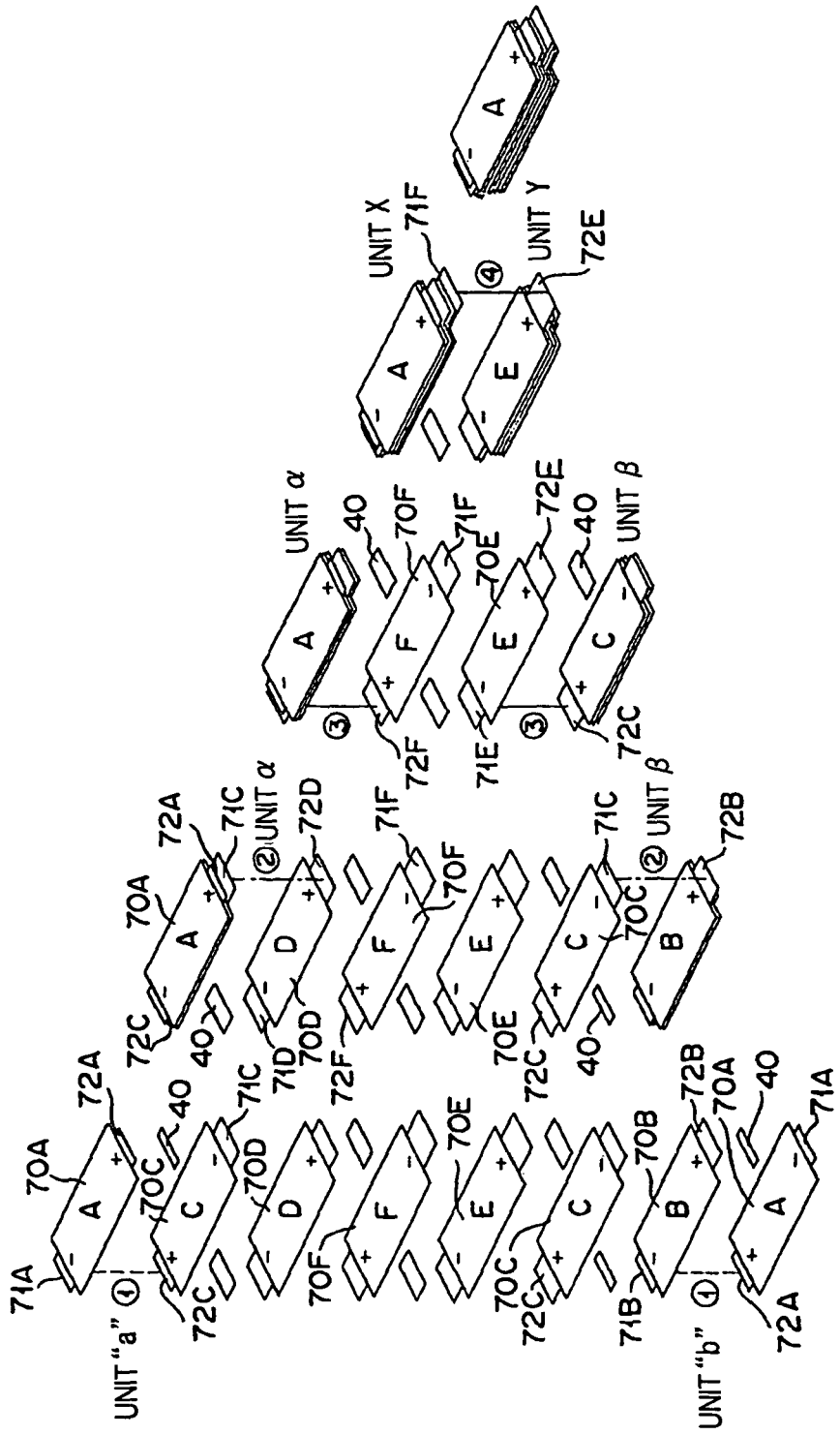
FIG. 26 is a drawing for explaining a production process of a combined battery according to Embodiment 5.

In the case of producing the combined battery according to the present Embodiment, the flat-type cells are arranged as shown in FIG. 25, and laminated as shown in FIG. 26. Specifically, from the top to the bottom, the flat-type cells 70A, 70C, 70D, 70F, 70E, 70C, 70B, and 70A shown in FIG. 24 are laminated in order.

Before laminated, units (the first unit) are produced in advance by combining the flat-type cells themselves indicated by the dotted line in FIG. 25, and by ultrasonic welding the prescribed electrode tabs themselves. Namely, as shown in FIG. 25, the unit "a" composed of a combination of the flat-type cells 70A and 70C with the shortest electrode tab, and the unit "b" composed of a combination of the flat-type cells 70B and 70A, totally 2 units, are produced in advance.

In the case of producing each of the units, the electrode tabs connected by the dotted line shown in FIGS. 25 and 26 (the left side), are welded themselves with the ultrasonic welding machine 200 shown in FIG. 2. For example, in FIG. 25, in the case of producing the unit "a" composed of a combination of the flat-type cells 70A and 70C, the minus side electrode tab 71A of the flat-type cell 70A, and the plus side electrode tab 72C of the flat-type cell 70C, are welded. And in the case of producing the unit "b" composed of a combination of the flat-type cells 70B and 70A, the minus side electrode tab 71B of the flat-type cell 70B, and the plus side electrode tab 72A of the flat-type cell 70A, are welded. When welding is performed in order described above, welding operation is easy.

When each of the units is produced, to prevent the plus side electrode tab 72A of the flat-type cell 70A located at the upper part, from electrically connecting with the minus side electrode tab 71C of the flat-type cell 70C located at the lower part thereof, the insulating body 40, as an insulation means with a prescribed shape, is made present between the electrode tab 72A and the electrode tab 71C. As the insulating body 40, a sheet-like one can be accepted or an insulating tape can be bonded on the lower surface (in the direction in the Figure) of the electrode tab 72A as well. The insulating body 40 with a prescribed shape is also made present inter-the electrode tabs 72B and 71A of the flat-type cells 70B and 70A composed of the unit "b".

Next, the unit α and the unit β (the second unit) are produced by welding the flat-type cell 70D to the unit "a", and welding the flat-type cell 70C to the unit "b" as shown in FIG. 25 and FIG. 26. As shown in the Figures, welding of the unit "a" and the flat-type cell 70D for producing the unit α, is performed by welding the electrode tab 71C of the flat-type cell 70C located at the bottom of the unit "a", and the electrode tab 72D of the flat-type cell 70D. Naturally, when the unit "a" and the flat-type cell 70D are welded, the insulating body 40 is made present inter-the electrode tabs for preventing electrical connection between electrode tabs (72C and 71D) of the side not to be welded. When welding of the unit "a" and the flat-type cell 70D is performed as above, because the length of the plus side electrode tab 72A of the flat-type cell 70A, is shorter than that of the minus side electrode tab 71C of the flat-type cell 70C, welding of the electrode tab 71C and the electrode tab 72D can be performed without touching the electrode tab 72A. In addition, for the same reason, welding of the electrode tab 72B of the flat-type cell 70B constructing the unit "b", and the electrode tab 71C of the flat-type cell 70C can be performed as well without being disturbed in any way by other electrode tab (71A).

Next, the unit X and the unit Y (the third unit) are produced by welding the flat-type cell 70F to the unit α, and welding the flat-type cell 70E to the unit β. As shown in the Figure, welding of the unit α and the flat-type cell 70F for producing the unit X, is performed by welding the electrode tab 71D of the flat-type cell 70D located at the bottom of the unit α, and the electrode tab 71F of the flat-type cell 70F. Naturally, when the unit α and the flat-type cell 70F are welded, the insulating body 40 is made present inter-the electrode tabs for preventing electrical connection between electrode tabs (72D and 71F) of the side not to be welded. When welding of the unit α and the flat-type cell 70F is performed as above, because the length of the electrode tab 71D and the electrode tab 72F are longer than those of the electrode tabs 71A and 72C, welding of the electrode tab 71D and the electrode tab 72F can be performed without touching the electrode tab 71A and 72C of the flat-type cells 70A and 70C constructing the unit α. In addition, for the same reason, welding of the electrode tab 72C of the flat-type cell 70C constructing the unit β, and the electrode tab 71E of the flat-type cell 70E, can be performed as well without being disturbed in any way by other electrode tabs (71B and 72A).

Finally, the combined battery according to the present Embodiment is produced by welding the unit X and the unit Y. Welding of the unit X and the unit Y is performed, as shown in FIG. 26, by welding the electrode tab 71F of the flat-type cell 70F located at the bottom of the unit X, and the electrode tab 72E of the flat-type cell 70E located at the top of the unit Y. Because length of the electrode tab 70F and electrode tab 70E is made longer than that of any other electrode tabs, the welding can be performed without being disturbed by other electrode tabs, and welding operation is easy.

As above, the combined battery according to the present Embodiment is formed by producing the units "a" and "b", next producing the units α and β, finally welding the units X and Y, and because welding of all the units is performed at the positions not interrupted by other electrode tabs, welding operation is easy. Accordingly, freedom of the head shape of the ultrasonic welding machine becomes greater and automation of welding operation becomes easy. In addition, because ultra sound is used for welding and no mechanical bonding part is present, generation of contact resistance variation or loosening due to vibration occurs is unlikely, and thus sufficient reliability can be kept in endurance-reliability and maintainability.

EMBODIMENT 6

Figure 27:
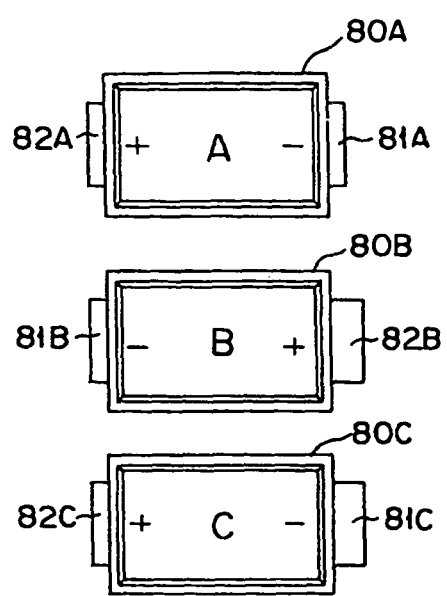
FIG. 27 is a drawing showing flat-type cells required for constructing a combined battery according to Embodiment 6.

A combined battery according to the present Embodiment is one formed by laminating 8 sheets of flat-type cells in the thickness direction thereof in the prescribed combination of 3 types of the flat-type cells having a combination of different length of the electrode tabs as shown in FIG. 27. Each one of the electrode tabs pulled out from both sides of the flat-type cell has a specific shape in each lamination layer position thereof so that welding positions are different each other when 8 sheets of the flat-type cells are laminated in order. The electrode tabs of the flat-type cells are electrically connected in series by welding with the ultrasonic welding machine 200 shown in FIG. 2. The electrode tabs of the combined battery are separated into 2 types in length so that the welding can be performed in order, from the short to the long, during assembling process. In the combined battery, all of the 8 sheets of flat-type cells are electrically connected in series in completely assembled state.

In addition, in the present Embodiment as well, because a method for mounting the combined battery already assembled, on a vehicle and a method for connecting the combined batteries themselves are the same as those in Embodiment 2, the explanation thereof is omitted.

Next, a method for producing the combined battery according to the present Embodiment will be explained.

The combined battery according to the present Embodiment makes the combination of electrode tab length of each of flat-type cells, different according to the position of lamination layer so that welding parts of the electrode tabs are separated into 2 places in the length direction. FIG. 27 shows the types of flat-type cells (electrode tabs are different in length) required for constructing the combined battery according to the present Embodiment. While the combined battery is composed of 8 laminated sheets of flat-type cells, the 3 types of flat-type cells with a combination of different length as shown in the Figure are used to separate the welding positions of the electrode tabs into 2 places in the length direction in the present Embodiment.

In the A type flat-type cell 80A, the length of the minus side electrode tab 81A and the plus side electrode tab 82A, are made shortest compared with other types of flat-type cells. The B type flat-type cell 80B has the length of the minus side electrode tab 81B, being the same as that of the plus side electrode tab 82A of the A type, and the length of the plus side electrode tab 82B, longer than that of the plus side electrode tab 81A and the minus side electrode tab 82A of the A type. The C type flat-type cell 80C has the length of the minus side electrode tab 81C, being the same as that of the plus side electrode tab 82B of the B type, and the length of the plus side electrode tab 82C, being the same as that of the minus side electrode tab 81B of the B type.

Figure 28:
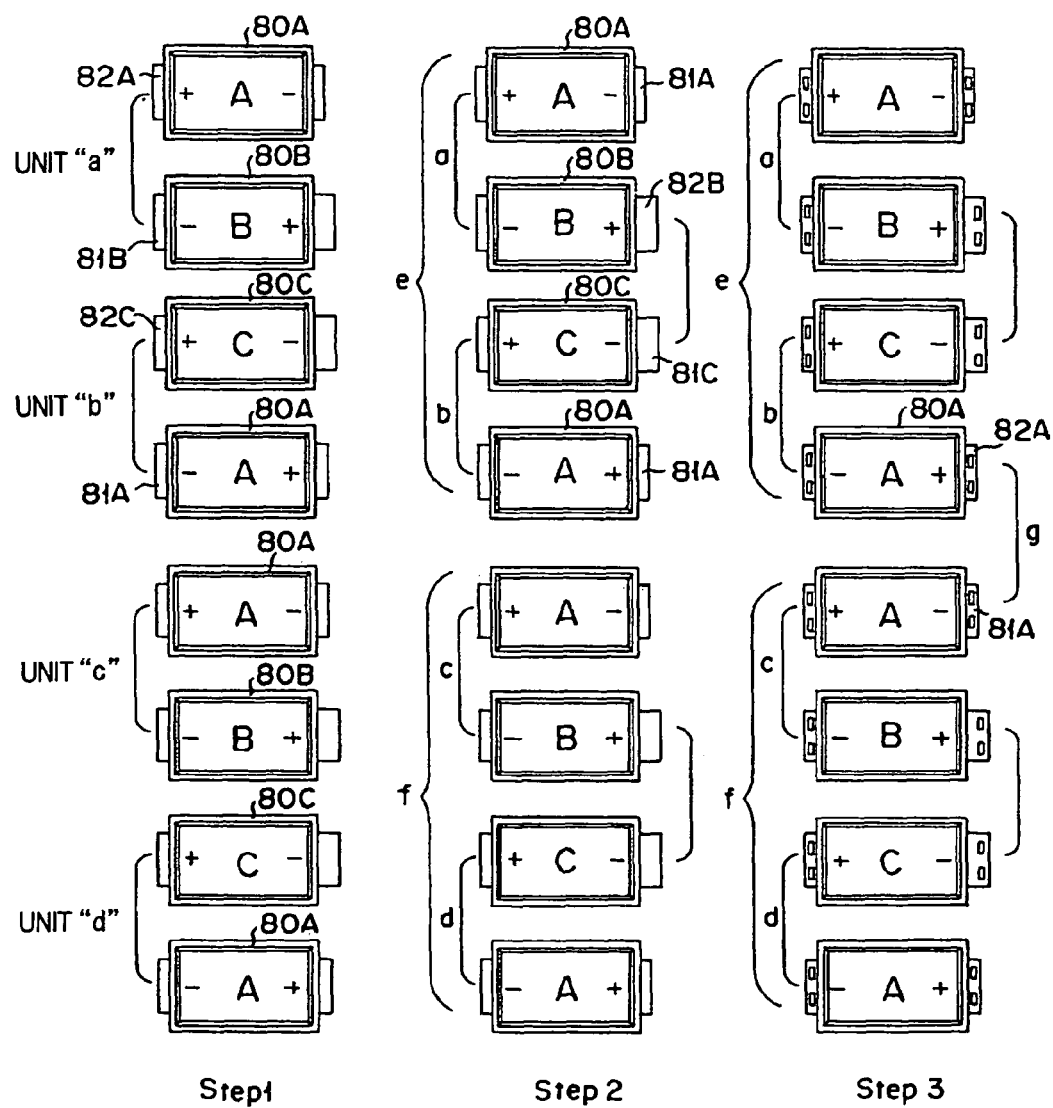
FIG. 28 is a drawing for explaining a production process of a combined battery according to Embodiment 6.

In the case of producing the combined battery according to the present Embodiment, the flat-type cells are arranged and laminated as shown in FIG. 28. Specifically, from the top to the bottom, the flat-type cells 80A, 80B, 80C, 80A, 80A, 80B, 80C and 80A shown in FIG. 27 are laminated in order.

Before laminated, units (the first unit) are produced in advance by combining the flat-type cells themselves indicated by the solid line in FIG. 28, and by ultrasonic welding the prescribed electrode tabs themselves. Namely, as shown in step 1 in FIG. 28, the unit "a" composed of a combination of the flat-type cells 80A and 80B, and the unit "b" composed of a combination of the flat-type cells 80C and 80A, and the unit "c" composed of a combination of the flat-type cells 80A and 80B, and the unit "d" composed of a combination of the flat-type cells 80C and 80A, totally 4 units, are produced in advance.

In the case of producing each of the units, the electrode tabs connected by the solid line shown in FIG. 28 (the left side), are welded themselves with the ultrasonic welding machine 200 shown in FIG. 2. For example, in FIG. 28, in the case of producing the units "a" and "c" composed of a combination of the flat-type cells 80A and 80B, the plus side electrode tab 82A of the flat-type cell 80A and the minus side electrode tab 81B of the flat-type cell 80B are welded. And in the case of producing the units "b" and "d" composed of a combination of the flat-type cells 80C and 80A, the plus side electrode tab 82C of the flat-type cell 80C and the minus side electrode tab 81A of the flat-type cell 80A, are welded. Though not shown in the Figure, in the case of producing each unit, the insulating body is made present inter-the electrode tabs of the side where welding is not performed.

Next, the unit "e" and the unit "f" are produced by welding both the unit "a" and the unit "b", and the unit "c" and the unit "d" as shown in the step 2 in FIG. 28. As shown in the Figure, welding both the unit "a" and the unit "b", and the unit "c" and the unit "d", are performed by welding the electrode tab 82B of the flat-type cell 80B located at the lower part of the units "a" and "C", and the electrode tab 81C of the flat-type cell 80C located at the upper part of the units "b" and "d". In the case of welding these units themselves as well, the insulating body not shown in the Figure, is made present inter-the electrode tabs to prevent short-circuit between the electrode tabs of the side where welding is not performed. When welding of the units "a" and "b", or the units "c" and "d", are performed as above, because the length of the plus side electrode tab 82B of the flat-type cell 80B, and the minus side electrode tab 81A of the flat-type cell 80C, is longer than that of the minus side electrode tab 81A of the flat-type cell 80A, welding of the electrode tab 82B and the electrode tab 81C can be performed without touching the electrode tab 81A.

Finally, the combined battery according to the present Embodiment is produced by welding the unit "e" and the unit "f".

Welding of the unit "e" and the unit "f" is performed, as shown in FIG. 28, by welding the electrode tab 82A of the flat-type cell 80A located at the bottom of the unit "e", and the electrode tab 81A of the flat-type cell 80A located at the top of the unit "f".

As above, the combined battery according to the present Embodiment is formed by producing the units "a", "b", "c" and "d", then producing the units "e" and "f", and finally welding the units "e" and "f", and because welding up to the units "e" and "f", is performed at the positions not interrupted by other electrode tabs, welding operation is easy.

EMBODIMENT 7

Figure 29:
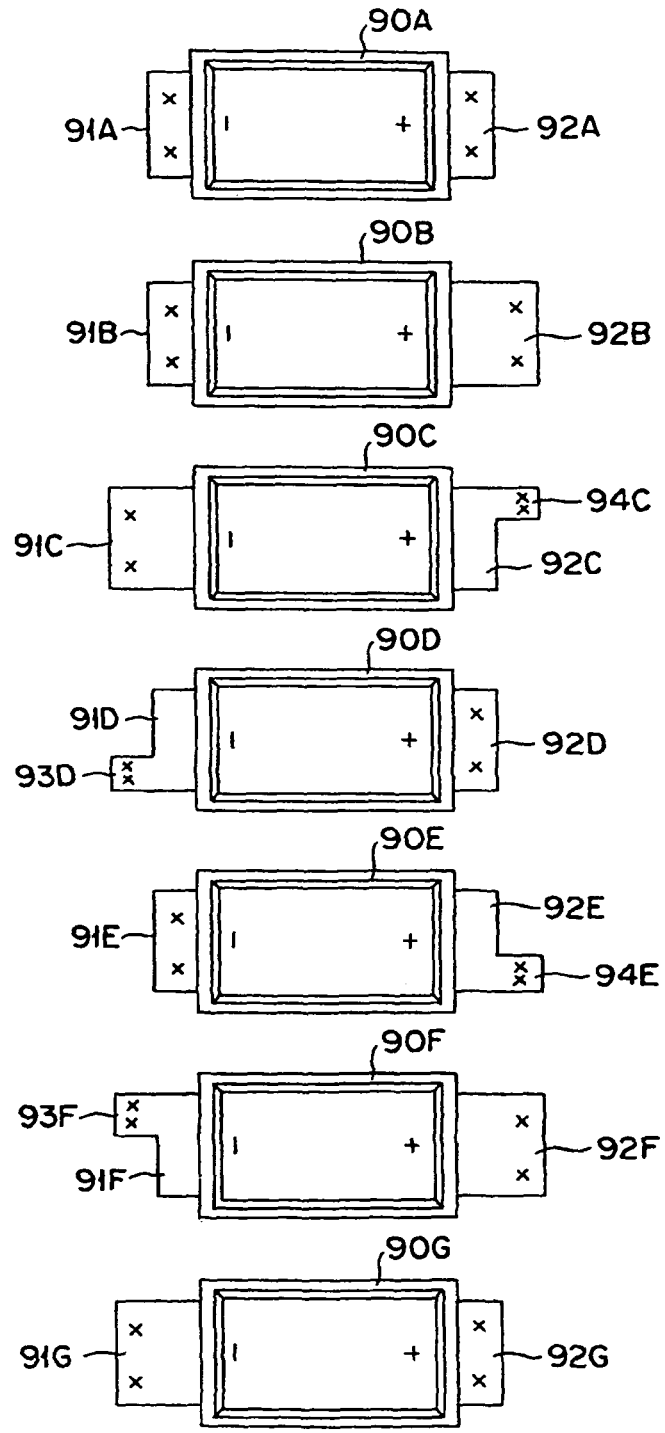
FIG. 29 is a drawing showing flat-type cells required for constructing a combined battery according to Embodiment 7.

A combined battery according to the present Embodiment is one formed by laminating 8 sheets of flat-type cells in the thickness direction thereof in the prescribed combination of the flat-type cells with 7 different shapes of the electrode tabs as shown in FIG. 29. Each one of the electrode tabs pulled out from both sides of the flat-type cell has a specific shape and length thereof in each lamination layer position thereof so that welding positions are different each other when 8 sheets of the flat-type cells are laminated in order. The electrode tabs of the flat-type cells are electrically connected in series by welding with the ultrasonic welding machine 200 shown in FIG. 2. In the electrode tabs of the combined battery, the protruding parts thereof are made separated in 2 directions in assembled state. In the combined battery, all of the 8 sheets of the flat-type cells are electrically connected in series, in assembled state.

In addition, in the present Embodiment as well, because a method for mounting the combined battery already assembled on a vehicle, and a method for connecting the combined batteries themselves, are the same as those in Embodiment 2, the explanation thereof is omitted.

Next, a method for producing the combined battery according to the present Embodiment will be explained.

The combined battery according to the present Embodiment makes the position of the electrode tabs separated into 2 directions so that the welding positions of the electrode tabs do not overlap, and makes the shape and the length of the electrode tabs of each of the flat-type cells different according to the position of lamination layer in order to make the welding positions of the electrode tabs different in the length direction of the cell. FIG. 29 shows the types of flat-type cells (the electrode tab shapes are different) required for constructing the combined battery according to the present Embodiment. While the combined battery is constructed by laminating 8 sheets of the flat-type cells, the flat-type cells with the electrode tabs having 7 types of shapes of the electrode tabs as shown in the Figure, are used to make welding positions of the electrode tabs dispersed into 4 places in the present Embodiment.

In the A type flat-type cell 90A, the lengths of the minus side electrode tab 91A and the plus side electrode tab 92A, are made shorter compared with other types of the flat-type cells. The B type flat-type cell 90B has the minus side electrode tab 91B with the same length as that of the minus side electrode tab 91A of the A type, and the plus side electrode tab 92B with the length longer than that of the plus side electrode tab 92A of the A type. While the C type flat-type cell 90C has the minus side electrode tab 91C and the plus side electrode tab 92C with the same length as that of the plus side electrode tab 92B of the B type, a part of the plus side electrode tab 92C is cut off, and the protruding part 94C is formed. While the D type flat-type cell 90D has the minus side electrode tab 91D with the same length as that of the plus side electrode tab 92B of the B type, and the plus side electrode tab 92D with the same length as that of the minus side electrode tab 91B of the B type, a part of the minus side electrode tab 91D is cut off, and the protruding part 93D is formed. While the E type flat-type cell 90E has the plus side electrode tab 92E with the same length as that of the plus side electrode tab 92B of the B type, and the minus side electrode tab 91E with the same length as that of the minus side electrode tab 91B of the B type, a part of the plus side electrode tab 92E is cut off, and the protruding part 94E is formed. While the F type flat-type cell 90F has the minus side electrode tab 91F and the plus side electrode tab 92F with the same length as that of the plus side electrode tab 92B of the B type, a part of the minus side electrode tab 91F is cut off, and the protruding part 93F is formed. The G type flat-type cell 90G has the plus side electrode tab 91G with the same length as that of the minus side electrode tab 91A of the A type, and the minus side electrode tab 91G with the same length as that of the plus side electrode tab 92B of the B type.

Figure 30:
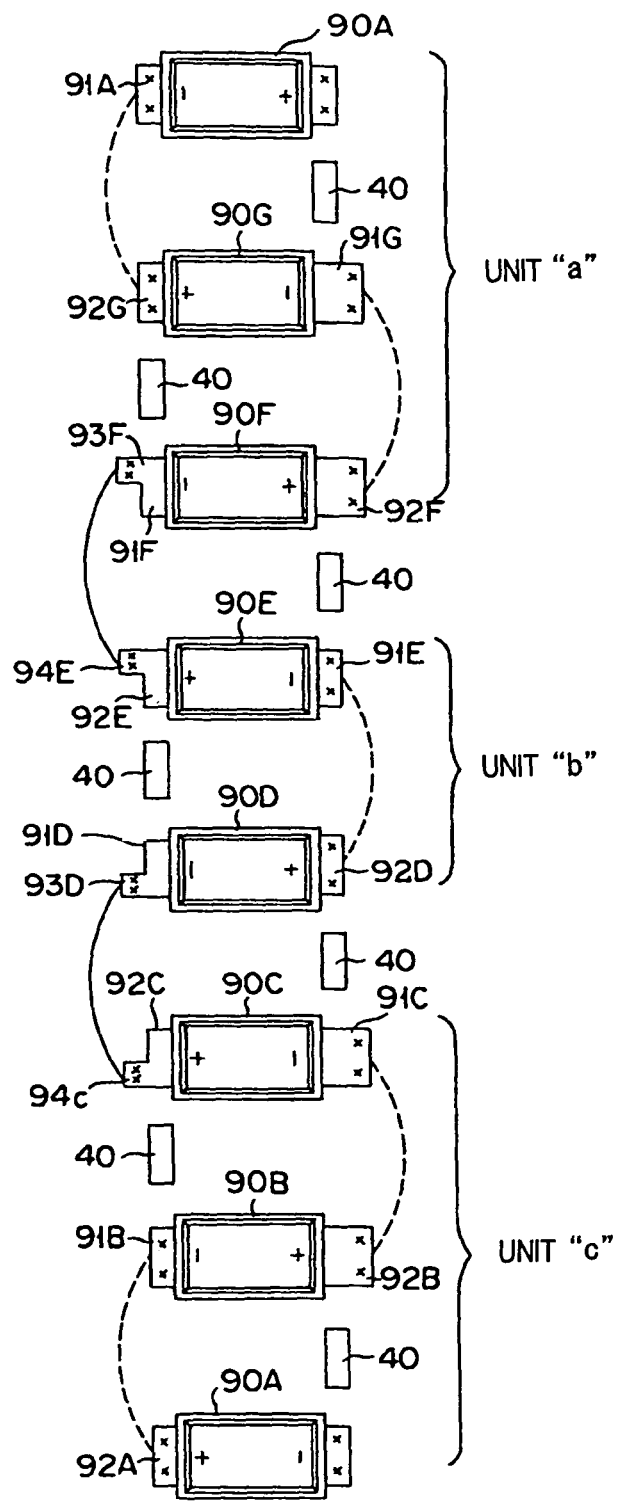
FIG. 30 is a drawing for explaining a production process of a combined battery according to Embodiment 7.
Figure 31:
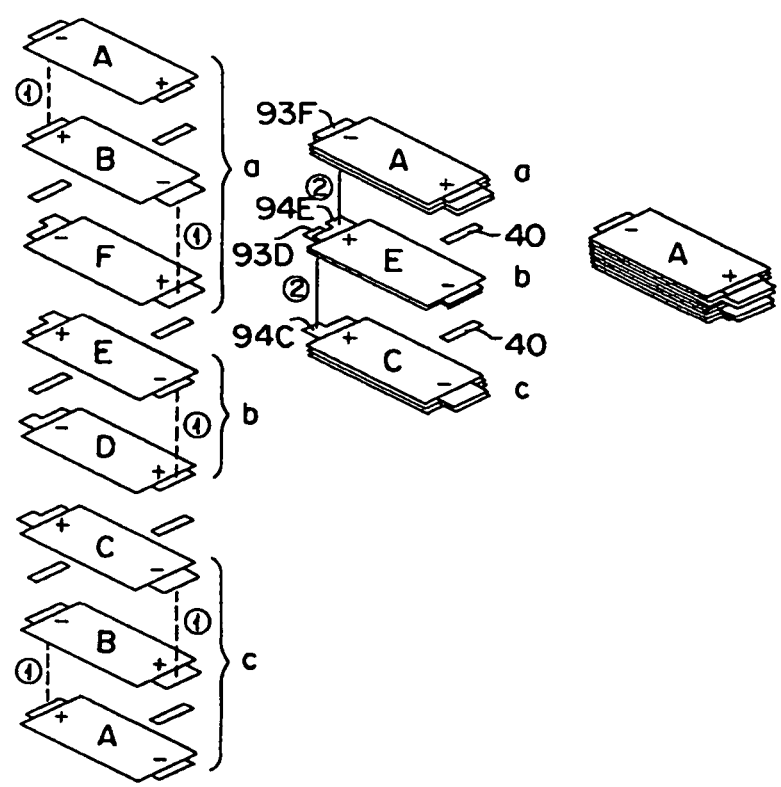
FIG. 31 is a drawing for explaining a production process of a combined battery according to Embodiment 7.

In the case of producing the combined battery according to the present Embodiment, the flat-type cells are arranged as shown in FIG. 30, and laminated as shown in FIG. 31. Specifically, from the top to the bottom, the flat-type cells 90A, 90G, 90F, 90E, 90D, 90C, 90B and 90A shown in FIG. 17 are laminated in order.

Before laminated, units are produced in advance by combining the flat-type cells themselves indicated by the dotted line in FIG. 30, and by ultrasonic welding the prescribed electrode tabs themselves Namely, as shown in FIG. 30, the unit "a" composed of the combination of the flat-type cells 90A, 90G and 90F, and the unit "b" composed of a combination of the flat-type cells 90E and 90D, and the unit "c" composed of a combination of the flat-type cells 90C, 90B and 90A, totally 3 units, are produced in advance.

In the case of producing each of the units, the electrode tabs connected by the dotted line shown in FIG. 30 and FIG. 31 (the left side), are welded themselves with the ultrasonic welding machine 200 shown in FIG. 2. For example, in FIG. 30, in the case of producing the unit "a" of a combination of the flat-type cells 90A, 90G and 90F, first the plus side electrode tab 92F of the flat-type cell 90F located at the lowest part and the minus side electrode tab 91G of the flat-type cell 90G located upper next, are welded. Next the plus side electrode tab 92G of the flat-type cell 90G and the minus side electrode tab 91A of the flat-type cell 90A, are welded. In addition, in the case of producing the unit "b", the plus side electrode tab 92D of the flat-type cell 90D and the minus side electrode tab 91E of the flat-type cell 90E located upper next, are welded. Further, in the case of producing the unit "c", the plus side electrode tab 92A of the flat-type cell 90A located at the lowest part and the minus side electrode tab 91B of the flat-type cell 90B located upper next, are welded. Next, the plus side electrode tab 92B of the flat-type cell 90B and the minus side electrode tab 91C of the flat-type cell 90C located upper next, are welded. When welding is performed in order as above, because welding of the electrode tabs themselves to be welded can be performed without being interrupted in any way by other electrode tabs, welding operation is easy. In the case of producing the units, the insulating body 40 is made present as shown in the figure between the electrode tabs of the side not to be welded. As the insulating body 40, a sheet-like one can be accepted, or an insulating tape can be bonded on the lower surface (in the direction in the figure) of the electrode tab as well.

Next, as shown in FIG. 31, the combined battery according to the present Embodiment is produced by welding the units "a", "b" and "c". Welding of the unit "a" and the unit "b" is performed by welding the protruding part 93F of the minus side electrode tab 91F of the flat-type cell 90F located at the bottom of the unit "a", and the protruding part 94E of the plus side electrode tab 92E of the flat-type cell 90E located at the upper part of the unit "b", and welding of the unit "b" and the unit "c", is performed by welding the protruding part 93D of the minus side electrode tab 91D of the flat-type cell 90D located at the lower part of the unit "b", and the protruding part 94C of the plus side electrode tab 92C of the flat-type cell 90C located at the top of the unit "c". Naturally, in the case of welding these units, the insulating body 40 is made present as shown in the Figure inter-the electrode tabs of the side not to be welded. By welding the units "a", "b", and "c" as above, because the protruding part 93F of the electrode tab 91F and the protruding part 94E of the electrode tab 92E, to be welded each other, are protruding from the electrode tabs 91A and 92G, and the protruding part 93D of the electrode tab 91D, and the protruding part 94C of the electrode tab 92C, to be welded each other, are protruding from the electrode tabs 91B and 92A, and further the welding position between the protruding part 93F and the protruding part 94E is different from the welding position between the protruding part 93D and the protruding part 94C, welding can be performed without being interrupted in any way by other electrode tabs.

As above, the combined battery according to the present Embodiment is formed by producing the units "a", "b" and "c", and, then by welding these units, and because welding of each of the units is performed at the positions not interrupted by other electrode tabs, welding operation is easy. Accordingly freedom of the head shape of the ultrasonic welding machine becomes greater and automation of welding operation becomes easy. In addition, because ultra sound is used for welding and no mechanical bonding part is present, generation of contact resistance variation or loosening due to vibration is unlikely, and thus sufficient reliability can be kept in endurance-reliability and maintainability.

EMBODIMENT 8

Figure 32:
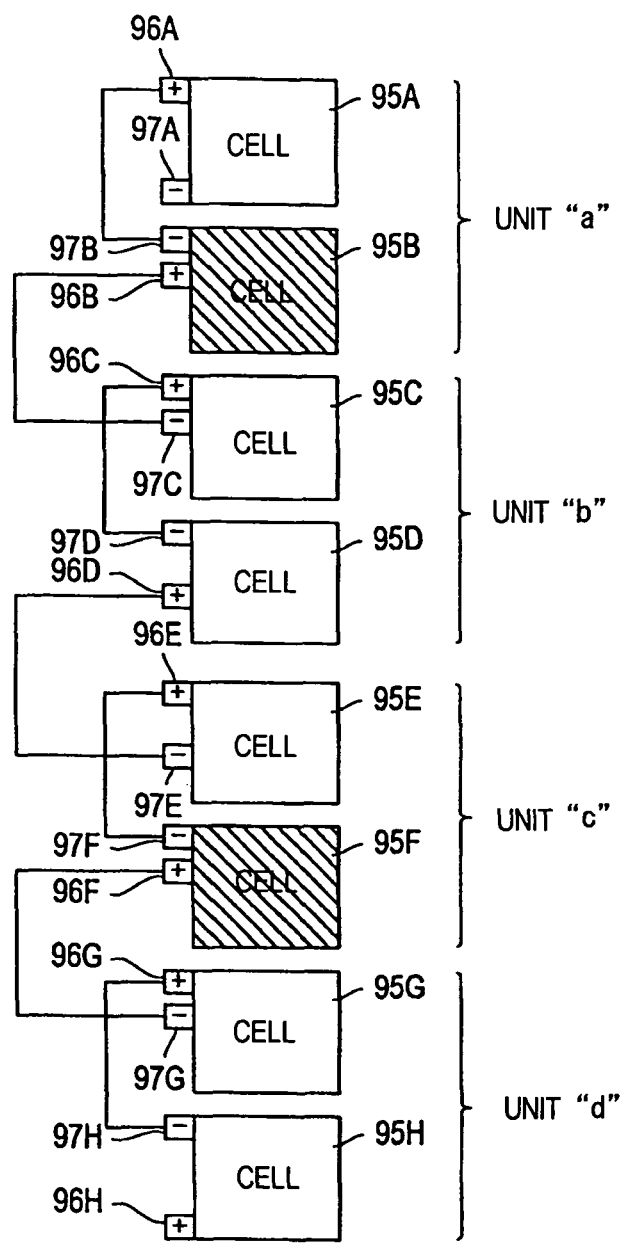
FIG. 32 is a drawing for explaining a production process of a combined battery according to Embodiment 8.

A combined battery according to the present Embodiment is one formed by laminating 8 sheets of flat-type cells in the thickness direction thereof in the prescribed combination thereof with 6 different positions where the electrode tabs thereof are pulled out, as shown in FIG. 32. Each one of the electrode tabs pulled out from the flat-type cell has different positions to be pulled out so that welding positions are different each other when 8 sheets of the flat-type cells are welded in order. The electrode tabs of the flat-type cells are electrically connected in series by welding with the ultrasonic welding machine 200 shown in FIG. 2. In the electrode tabs of the combined battery, the protruding parts thereof are made separated in 4 directions in assembled state. In the combined battery, all of the 8 sheets of the flat-type cells are electrically connected in series, in assembled state.

In addition, in the present Embodiment as well, because a method for mounting the combined battery already assembled, on a vehicle, and a method for connecting the combined batteries themselves, are the same as those in Embodiment 2, the explanation thereof is omitted.

Next, a method for producing the combined battery according to the present Embodiment will be explained.

The combined battery according to the present Embodiment makes the position of the flat-type cell where the electrode tabs are pulled out, different according to the position of lamination layer so as to separate the welding positions of the electrode tabs into 4 directions. FIG. 32 shows the types of flat-type cells (the positions where the electrode tabs are pulled out are different) required for constructing the combined battery according to the present Embodiment. While the combined battery is composed of 8 laminated sheets of the flat-type cells, the flat-type cells with the electrode tabs having 6 types of the positions where the electrode tabs are pulled out as shown in the Figure, are used to separate welding positions of the electrode tabs into 4 directions in the present Embodiment.

In the flat-type cells 95A and 95H, the minus side electrode tabs 97A and 97H, and the plus side electrode tabs 96A and 96H are pulled out from the both ends of the flat-type cells 95A and 95H. In the flat-type cells 95B, 95C, 95F and 95G, the minus side electrode tabs 97B, 97C, 97F, and 97G, and the plus side electrode tabs 96B, 96C, 96F, and 96G are pulled out with being adjacent to each other thereof. In the flat-type cells 95D and 95E, the minus side electrode tabs 97D and 97E and the plus side electrode tabs 96D and 96E are pulled out with having a certain distance therebetween.

In the case of producing the combined battery according to the present Embodiment, first the unit "a" is produced by welding the plus side electrode tab 96A of the flat-type cell 95A, and the minus side electrode tab 97B of the flat-type cell 95B, the unit "b" is produced by welding the plus side electrode tab 96C of the flat-type cell 95C, and the minus side electrode tab 97D of the flat-type cell 95D, the unit "c" is produced by welding the plus side electrode tab 96E of the flat-type cell 95E, and the minus side electrode tab 97F of the flat-type cell 95F, and the unit "d" is produced by welding the plus side electrode tab 96G of the flat-type cell 95G and the minus side electrode tab 97H of the flat-type cell 95H. When the units are produced, because welding can be performed at completely different positions, welding operation is easy.

Then, the units "a" and "b" are laminated and the plus side electrode tab 96B of the flat-type cell 95B and the minus side electrode tab 97C of the flat-type cell 95C, are welded. At this time, an insulating body is made present between the minus side electrode tab 97B of the flat-type cell 95B, and the plus side electrode tab 96C of the flat-type cell 95C. Similarly the units "c" and "d" are laminated and the plus side electrode tab 96F of the flat-type cell 95F, and the minus side electrode tab 97G of the flat-type cell 95G are welded. At this time, an insulating body is made present between the minus side electrode tab 97F of the flat-type cell 95F, and the plus side electrode tab 96G of the flat-type cell 95G.

In addition, finally the units "a" to "d" are laminated by welding the plus side electrode tab 96D of the flat-type cell 95D and the minus side electrode tab 97E of the flat-type cell 95E. At this time, an insulating body is made present between the minus side electrode tab 97C of the flat-type cell 95C, and the plus side electrode tab 96F of the flat-type cell 95F. For confirmation, when such welding is performed, it is the same as in Embodiments 1 to 3 for an insulating body to be made present inter-the electrode tabs requiring insulation. When welding of the units themselves is performed as above, because the protruding parts of the electrode tabs to be object of welding are located at the positions not interrupted at all by other parts, welding operation is easy.

As above, the combined battery according to the present Embodiment is formed by producing the units "a", "b", "c" and "d", and next welding the unit "a" and the unit "b", further welding the unit "c" and the unit "d", and finally welding all the units, and because welding of each of the units is performed at the positions not interrupted by other electrode tabs, welding operation is easy. Accordingly freedom of the head shape of the ultrasonic welding machine becomes greater and automation of welding operation becomes easy. In addition, because ultra sound is used for welding and no mechanical bonding part is present, generation of contact resistance variation or loosening due to vibration is unlikely, and thus sufficient reliability can be kept in endurance-reliability and maintainability.

EMBODIMENT 9

Figure 33:
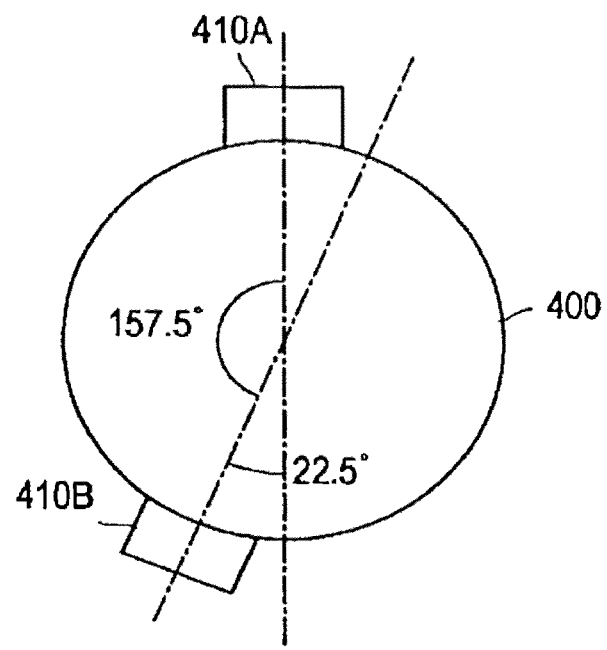
FIG. 33 is a drawing showing a shape of a flat-type cell according to Embodiment 9.

A combined battery according to the present Embodiment is one formed by laminating 16 sheets of flat-type cells in the thickness direction thereof with a circular shape, and arranged to have specified central angle so that the plus side electrode tab and the minus side electrode tab are connected as shown in FIG. 33.

Figure 34:
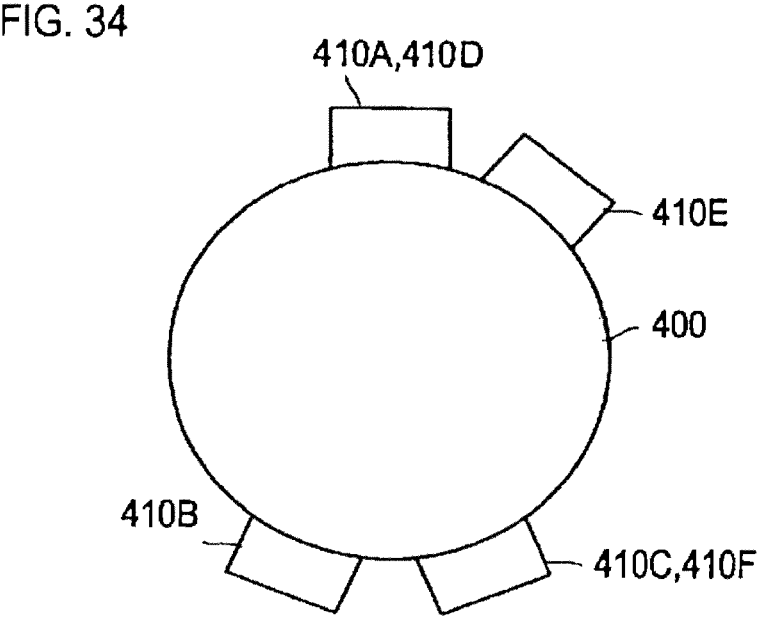
FIG. 34 is a drawing for explaining a production process of a combined battery according to Embodiment 9.

As shown in the Figure, the combined battery 400 according to the present Embodiment has a circular shape viewed from the lamination direction, and the plus side electrode tab 410A is arranged to have a central angle of 157.5 degree relative to the minus side electrode tab 410B so as to be off set from diameter with the electrode tab 410B as a base point. The flat-type cells 400 having the electrode tabs with the positional relation being off set with each other thereof as described, are laminated by overlapping the plus side electrode tab and the minus side electrode tab thereof in the lamination direction. FIG. 34 shows the state of arrangement of the electrode tabs, when 3 sheets of the flat-type cells are laminated. On the plus side electrode tab 410A of the flat-type cell 400 located at the lowest position, the minus side electrode tab 410D of the flat-type cell 400 to be laminated thereon, is overlapped, and on the plus side electrode tab 410C of the flat-type cell 400 laminated, the minus side electrode tab 410F of the flat-type cell 400 to be laminated thereon, is overlapped. When 16 sheets of the flat-type cell 400 are laminated as described, the electrode tabs come to protrude from evenly separated 16 different places of the peripheral part of the flat-type cells. In this state, the electrode tabs at 14 places except the electrode tabs at two places to take out voltage, are welded by the ultrasonic welding machine 200 shown in FIG. 2. In the case of welding, welding of the electrode tabs themselves to compose the combined battery is performed while positioning a welding jig and the electrode tabs in the direction of the periphery of the cells, along with vertically positioning the welding jig. In this way, all of the flat-type cells 400 are connected in series.

Figure 35:
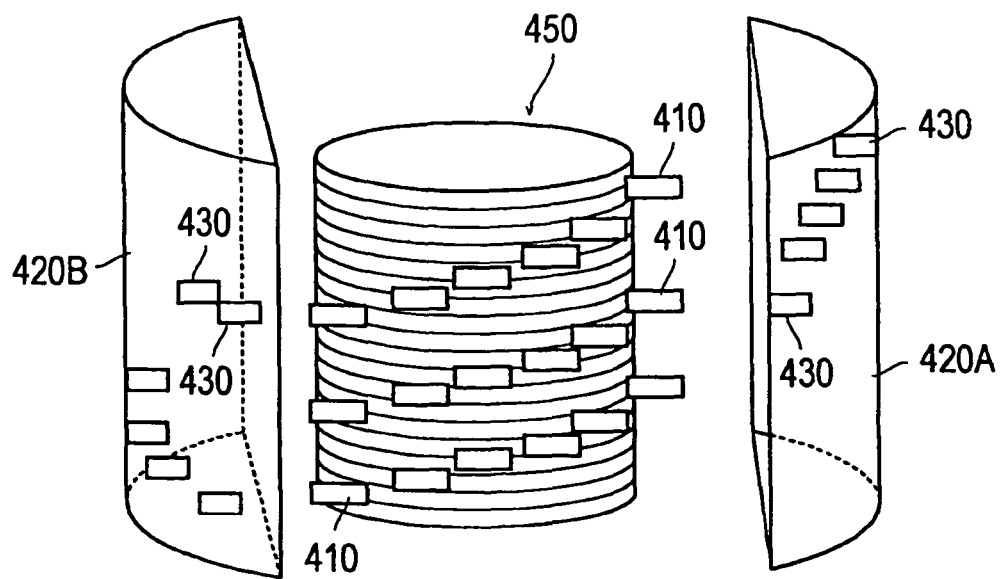
FIG. 35 is a drawing for explaining a production process of a combined battery according to Embodiment 9.
Figure 36:
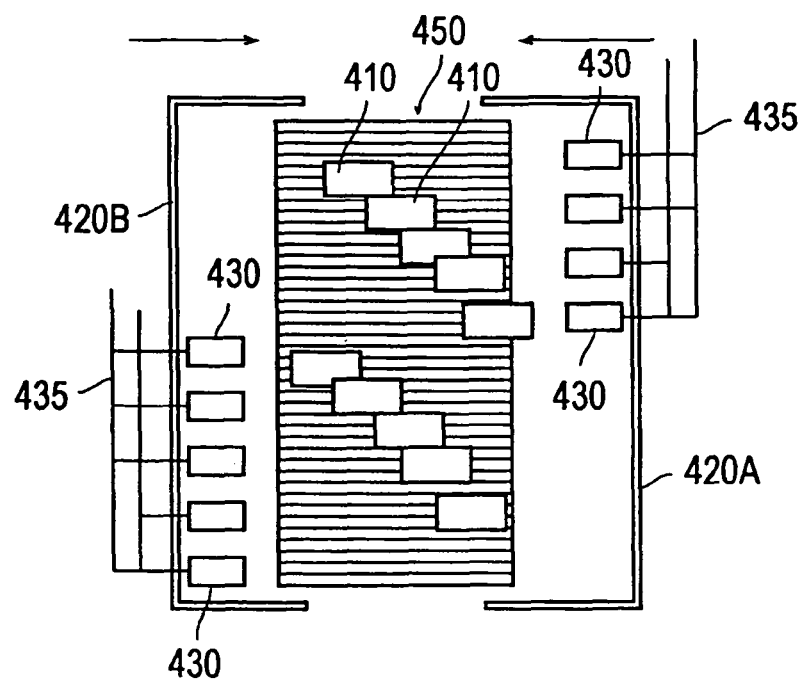
FIG. 36 is a drawing for explaining a production process of a combined battery according to Embodiment 9.

In the present Embodiment, the combined battery unit 450 is formed by further laminating a plurality (for example, 6 stages) of the combined batteries formed as described, and is fixed by being sandwiched from both sides by the cases 420A and 420B divided in 2 parts as shown in FIG. 35 and FIG. 36. While the welded electrode tabs 410 are protruding from the periphery of the assembled battery unit 450, because the connectors 430, with the number thereof corresponding to that of the electrode tabs, are mounted at the positions corresponding to the electrode tabs, in the cases 420A and 420B, all the electrode tabs 410 are designed to fit neatly in the connectors when the cases 420A and 420B are assembled with the combined battery unit 450. In addition, the connectors are equipped with to detect voltage of each of the flat-type cells 400, and the signal wires 435 are connected to all the connectors, and voltage of each of the flat-type cells can be detected from outside. When the connectors 430 are mounted in the cases 420A and 420B in this way, wiring operation of the signal wires to detect voltage becomes unnecessary and therefore efficiency of assembling operation can considerably be enhanced.

Figure 37:
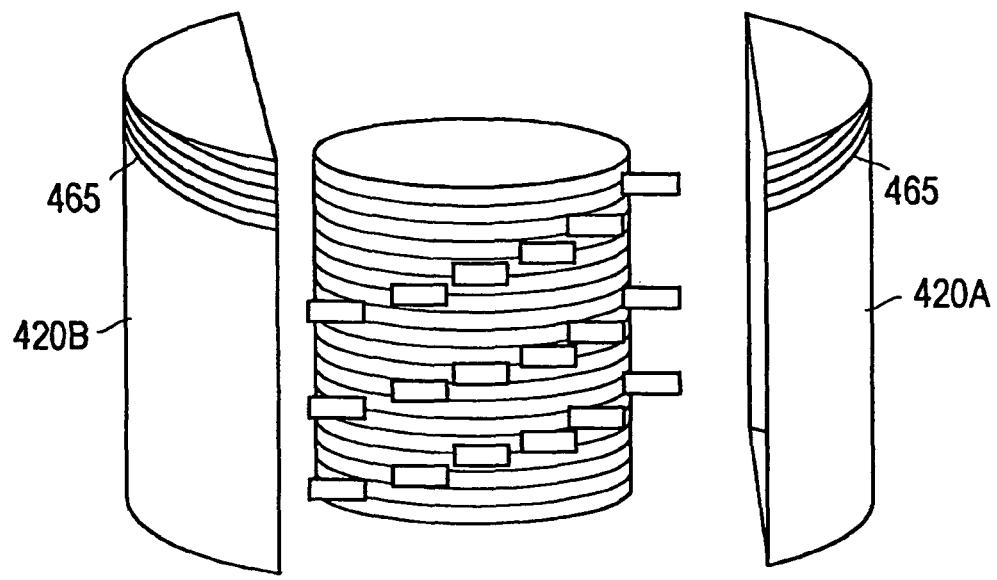
FIG. 37 is a drawing for explaining a production process of a combined battery according to Embodiment 9.
Figure 38:
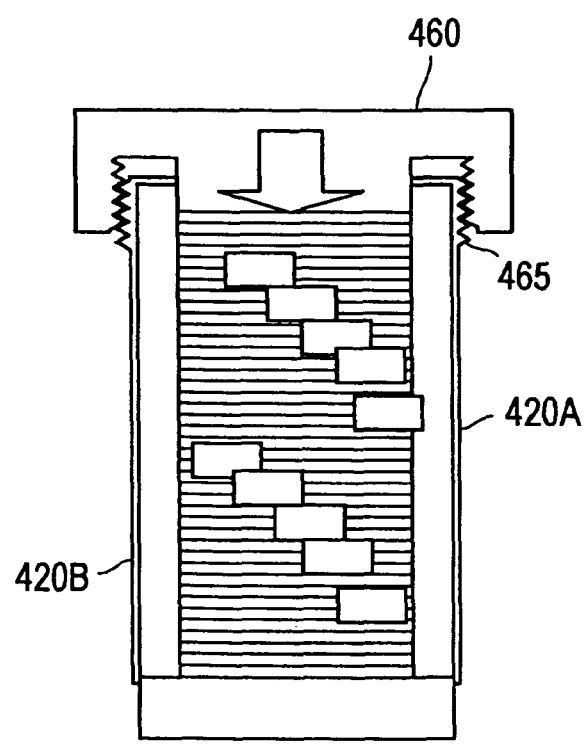
FIG. 38 is a drawing for explaining a production process of a combined battery according to Embodiment 9.

Furthermore, as shown in FIG. 37 and FIG. 38, the thread 465 is formed at the upper part of the cases 420A and 420B, to mount the compression cap 460 so as to apply surface pressure in the lamination direction on all the flat-type cells 400. As shown in FIG. 36, the combined battery unit 450 is set into the cases 420A and 420B, and the compression cap 460 is mounted by screwing the thread of the compression cap 460 to the thread 465 as shown in FIG. 38. When the compression cap 460 is getting fastened by screwing, surface pressure in the lamination direction is added on the flat-type cells 400 as shown in the Figure. When the surface pressure is kept added in this way, the lifetime of the combined battery unit 450 can be extended. This is because, though gas generates inside as change with time when the flat-type cells 400 are used, when surface pressure is being added, the generated gas can be pushed away to the peripheral part of the flat-type cells 400. As the surface pressure, a pressure of approximately 0.15 Kgf/cm$^2$ be preferable. Accordingly, the compression force applied by the compression cap 460 becomes approximately 120 Kgf in the case of the present Embodiment.

Figure 39:
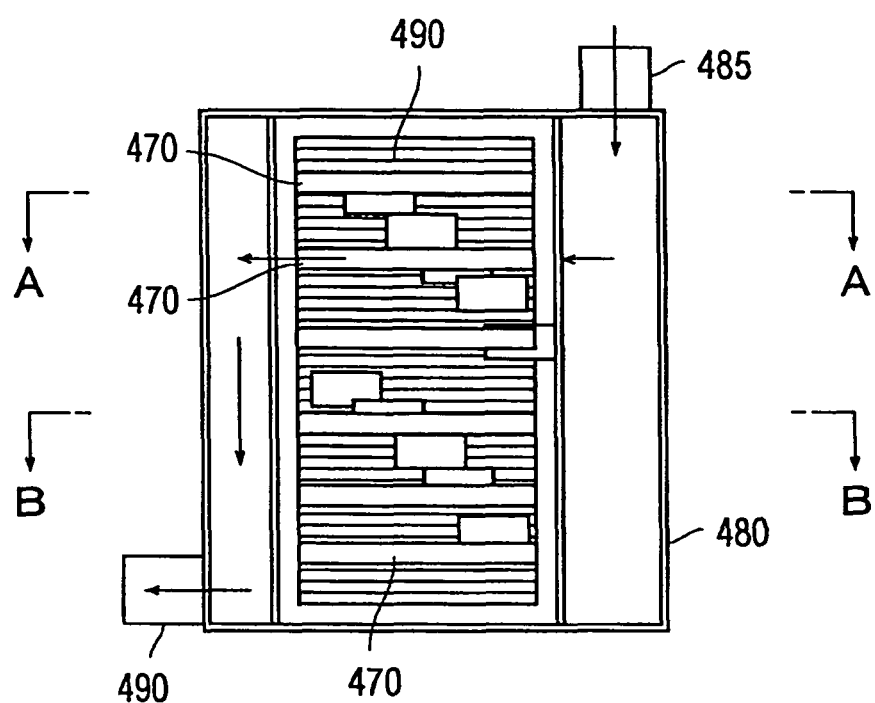
FIG. 39 is a drawing for explaining a production process of a combined battery according to Embodiment 9.
Figure 40:
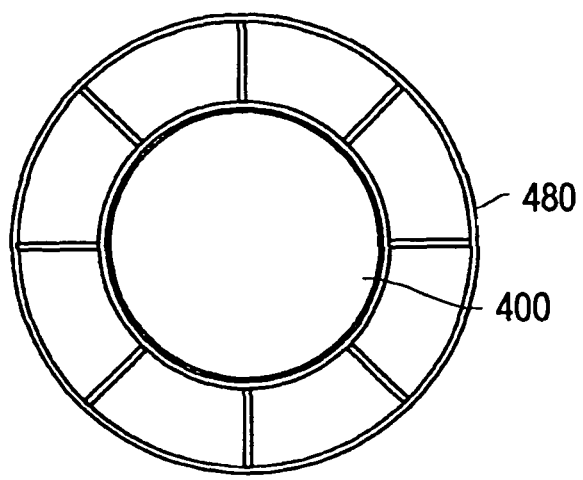
FIG. 40 is a drawing for explaining a production process of a combined battery according to Embodiment 9, wherein (A) is a cross-sectional view of FIG. 39 along the line A-A, and (B) is a cross-sectional view of FIG. 39 along the line B-B.
Figure 40:
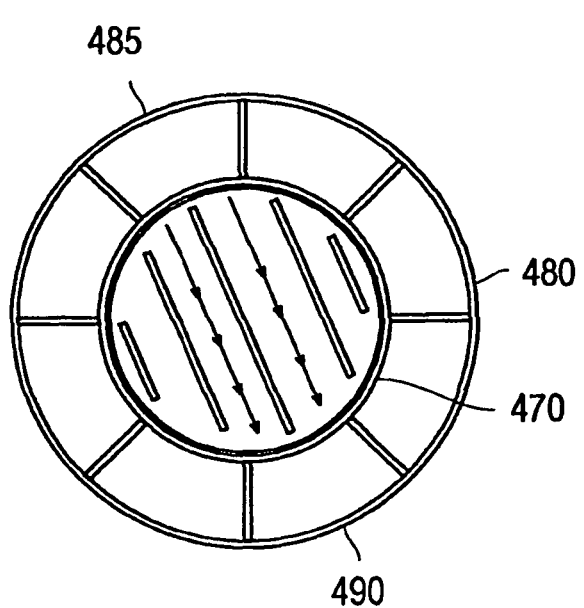

Next, the cooling case 480 is mounted as shown in FIG. 39 and FIG. 40, to make cooling air pass through the combined battery unit 450. Though not explained above, while forming the combined battery 450, when laminating a combined battery and another combined battery, the spacer 470 for cooling is made present therebetween. In the spacer 470, a lot of through-passages capable of making air pass through in one direction, are formed inside. In addition, as shown in the Figure, the air inlet hole 485 and the air outlet hole 490 are formed in the cooling case 480. FIG. 40(A) is a cross-sectional view of FIG. 39 along the line A-A, showing the positional relation of the cooling case 480 and the combined battery 400, and FIG. 40(B) is a cross-sectional view of FIG. 39 along the line B-B, showing the positional relation of the cooling case 480 and the spacer 470. The air inlet hole 485 and the air outlet hole 490 are independently formed at the positions shown in FIG. 40(B). Therefore, as shown in FIG. 39, when the combined battery unit 450 is inserted in the cooling case 480, and air is supplied to the air inlet hole 485, supplied air comes to the air outlet hole 490 through the through-passages of each of the spacers 470. Because both sides of the spacer 470 contact directly to the combined battery 400, the combined batteries are cooled by air supplied to the cooling case 480.

Figure 41:
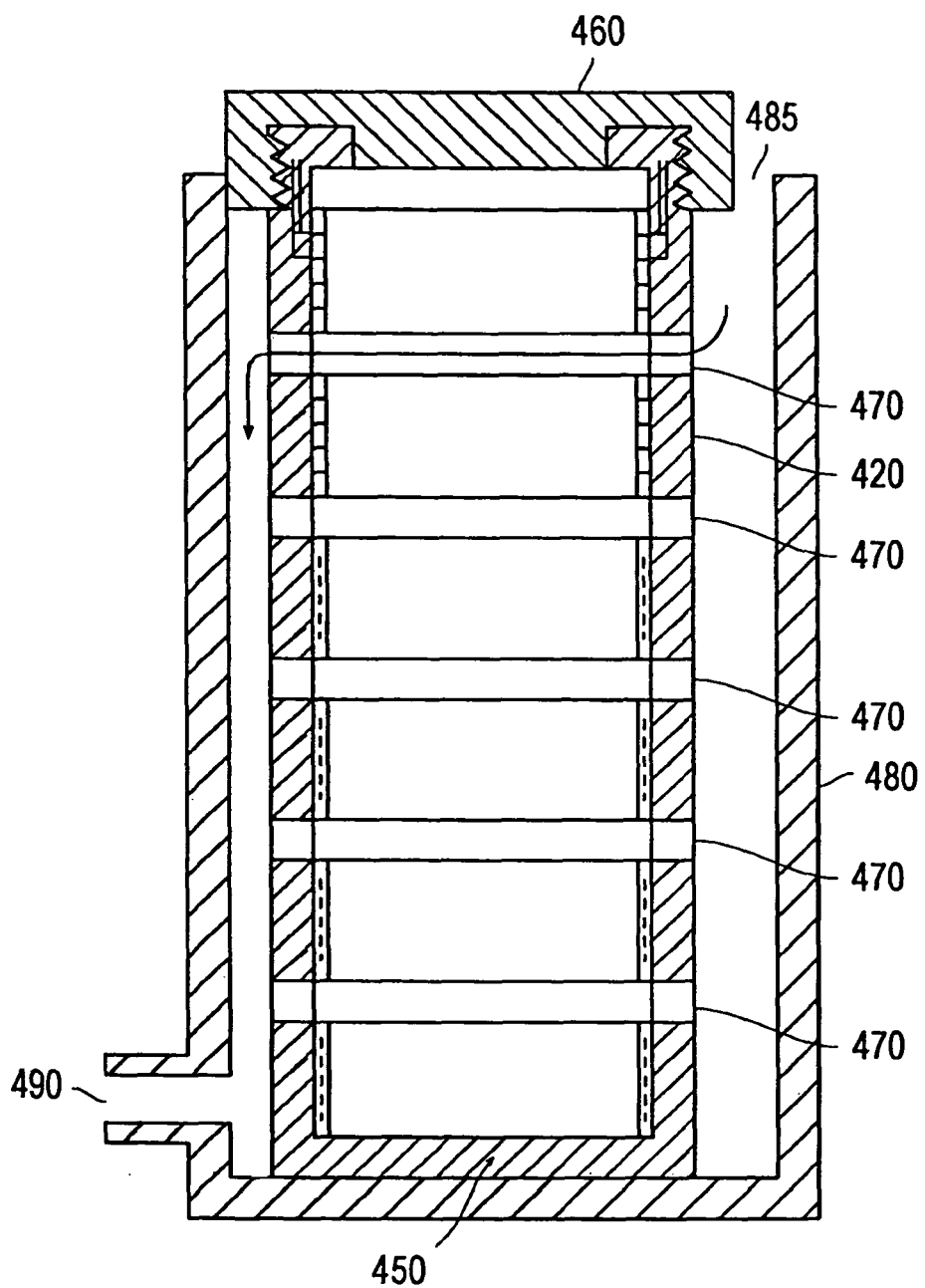
FIG. 41 is a cross-sectional view of a battery according to Embodiment 9.

FIG. 41 is a cross-sectional view of the battery according to the present Embodiment.

As shown in the Figure, the combined battery unit 450 set in the case 420 is received inside the cooling case 480. The combined battery unit 450 is formed by laminating 6 combined batteries with 5 spacers being made present therebetween. The connectors mounted in the case 420 are automatically united with the electrode tabs protruding from the peripheral of the combined batteries when the case is assembled. Because the case 420 is equipped with the compression cap 460, the flat-type cells constructing the combined battery are compressed with suitable pressure in the lamination direction. Because the air inlet hole 485 and the air outlet hole 490 are formed in the cooling case 480, air supplied from the air inlet hole 485 is exhausted from the air outlet hole 490 through all of the spacers 470 as shown in the Figure.

In addition, while the battery with such construction is mounted on a vehicle, for example, because a method for mounting the battery on a vehicle, and a method for connecting the batteries themselves, are the same as those in Embodiment 2, the explanation thereof is omitted.

In addition, though the flat-type cell with a circular shape is explained as an example in the present Embodiment, it should be taken for granted that a polygonal shape such as a pentagonal one or a hexagonal one, and the like, is also applicable. Even in the case of a polygonal one, it will be obvious that one side of the electrode tabs is made off set as in the present Embodiment.

EMBODIMENT 10

Figure 42:
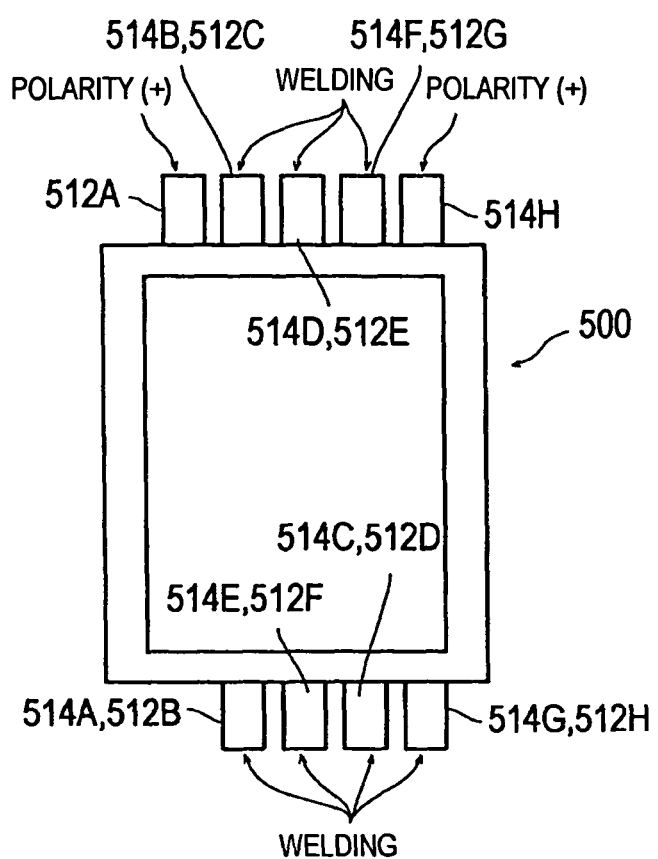
FIG. 42 is an outline view of a combined battery according to Embodiment 10 relevant to the present invention.

FIG. 42 is an outline view of a combined battery according to Embodiment 10 relevant to the present invention.

Figure 43:
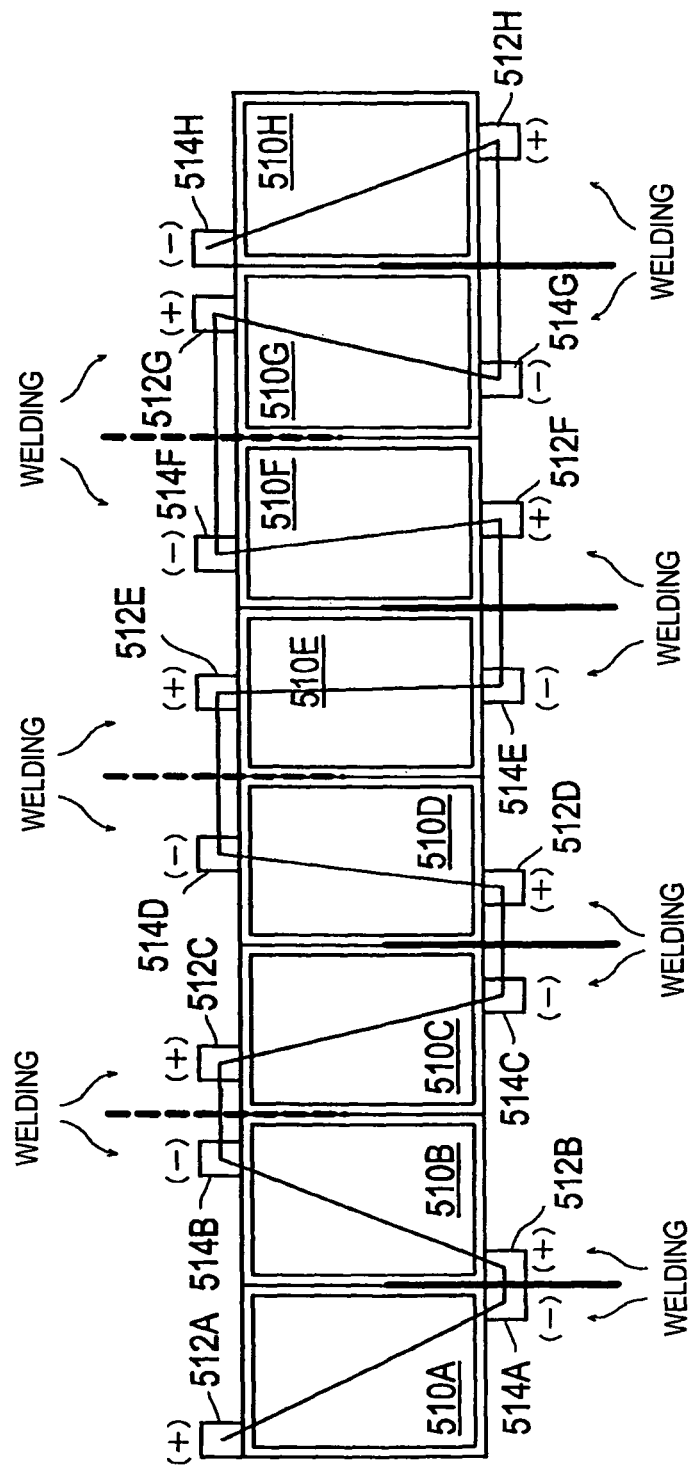
FIG. 43 is a drawing for explaining a production process of a combined battery according to Embodiment 10.

The combined battery 500 according to the present Embodiment is one formed by laminating 8 sheets of flat-type cells in the thickness direction thereof so that polarity of electrode tabs is alternately set, and one formed by folding a series of the combined batteries with a plurality of flat-type cells sequentially connected in a form of a sheet. The combined battery 500 according to the present Embodiment has a construction, wherein all of the flat-type cells are electrically connected by welding the entire electrode tabs thereof, because the electrode tabs for welding the flat-type cells themselves in series are separated at a plurality of positions of the flat-type cells, when all of the flat-type cells are laminated. Specifically, as shown in FIG. 43, the flat-type cells are rectangular in shape viewed from the top, and the welding parts of the electrode tabs are arranged so that the positions thereof become different in the shorter-length direction of the flat-type cells, when folding of a series of the flat-type cells (which is constructed by 8 sheets of the flat-type cells which are sequentially connected with adjacent sides themselves having no electrode tabs) which are sequentially connected in a form of a sheet, is finished. Therefore, the positions for the electrode tabs to be pulled out from both sides of all the flat-type cells composing the flat-type cells in a form of a sheet are different according to each lamination position thereof so that the electrode tabs to compose a set, are separated into 4 directions when 8 sheets of the flat-type cells are laminated. In the present Embodiment, 8 types of flat-type cells, with the electrode tabs pulled out at different positions, are used to separate the positions of the electrode tabs into 4 directions.

The electrode tabs of the flat-type cells are electrically connected by welding with the ultrasonic welding machine 200 shown in FIG. 2. The electrode tabs of the flat-type cells are arranged so that the protruding parts thereof are separated into 4 directions, as shown in FIG. 42, in lamination finished state. In the combined battery, 8 sheets of flat-type cells are all connected in series in completely assembled state.

In the combined battery according to the present Embodiment, because all the flat-type cells laminated can electrically be connected separately at 4 places with no overlapping in the lamination direction, welding of all the flat-type cells can be performed while in laminated state, therefore workability is good, and further automation of welding operation is easy. Furthermore, the electrode tabs already welded is unlikely to be applied with unnecessary stress, and because no mechanical bonding part with bolts, nuts, washers, and the like, is present, endurance-reliability and maintainability are excellent.

In addition, in the present Embodiment as well, because a method for mounting the combined battery already assembled, on a vehicle, and a method for connecting the combined batteries themselves, are the same as those in Embodiment 2, the explanation thereof is omitted.

Next, a method for producing the combined battery according to the present Embodiment will be explained.

As outlined above, the flat-type cells in a form of a sheet, according to the present Embodiment, are sequentially connected with adjacent sides themselves having no electrode tabs, as shown in FIG. 43, and the electrode tabs are pulled out at the different positions from each of the cells. As shown in the Figure, the plus side electrode tab 512A is pulled out from the upper-left end, in the Figure, of the flat-type cell 510A, and the minus side electrode tab 514A is pulled out differently from the lower-right end thereof. The plus side electrode tab 521B is pulled out from the lower-left end of the flat-type cell 510B, and the minus side electrode tab 514B is pulled out differently, at the upper-left side thereof, from the position shifted inward just by a little larger width than that of the electrode tab. From the upper side of the flat-type cell 510C and the lower side of the flat-type cell 510G, the plus side electrode tabs 512C and 512G, and the minus side electrode tabs 514C and 514G are pulled out, respectively, at the positions shifted inward just by a little larger width than that of the electrode tab. In the upper side of the flat-type cell 510D, the minus side electrode tab 514D is pulled out from the center thereof, and in the lower side thereof, the plus side electrode tab 512D is pulled out at the position shifted inward just by a little larger width than that of the electrode tab. From the centers of the upper side and the lower side of the flat-type cell 510E, the plus side electrode tab 512E and the minus side 514E are pulled out. In the lower side of the flat-type cell 510F, the plus side electrode tab 512F is pulled out from the center thereof, and in the upper side thereof, the minus side electrode tab 514F is pulled out at the position shifted inward just by a little larger width than that of the electrode tab. From the upper-left end of the flat-type cell 510H, the minus side electrode tab 514H, and at the lower-right side thereof, from the position shifted inward just by a little larger width than that of the electrode tab, the plus side electrode tab 514H are differently pulled out.

Figure 44:
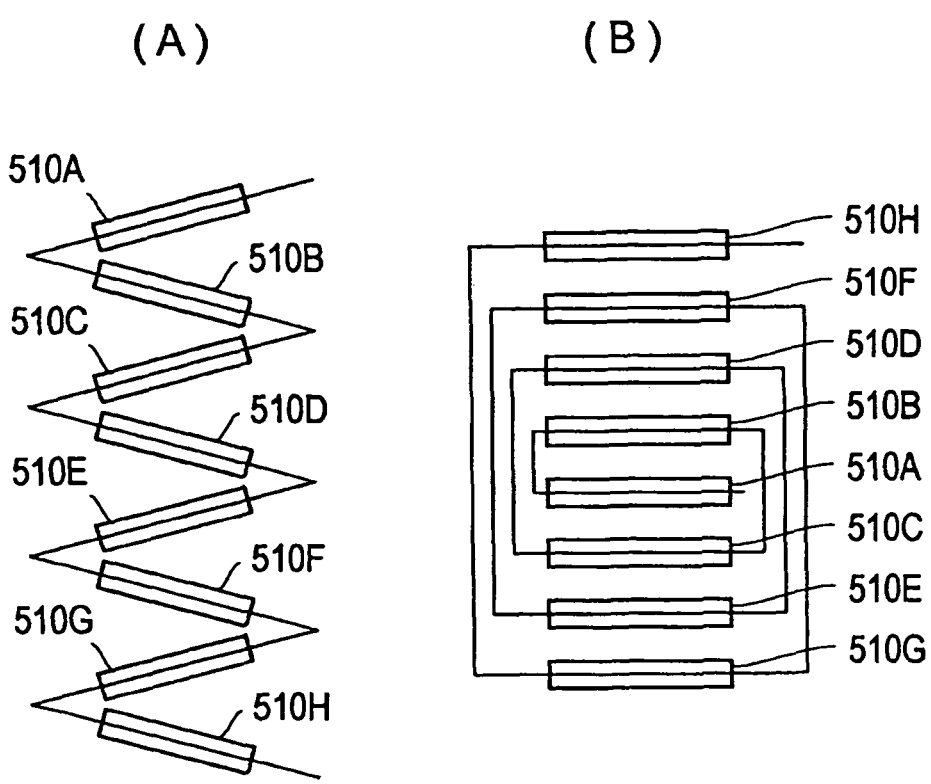
FIG. 44 is a drawing for explaining a production process of a combined battery according to Embodiment 10, wherein (A) is a drawing showing one example of a folding method, and (B) is a drawing showing another example of a folding method.

When folding the flat-type cells, wherein the electrode tabs are pulled out from the positions as described above, in zigzags as shown in FIG. 44 (*a*), the plus electrode tab and the minus electrode tab of each of the flat-type cells overlap at different positions as shown in FIG. 42. Specifically, the electrode tabs 514A and 512B overlap as a set, the electrode tabs 514C and 512D overlap as a set, the electrode tabs 514E and 512F overlap as a set, the electrode tabs 512G and 512H overlap as a set, the electrode tabs 514B and 512C overlap as a set, the electrode tabs 514D and 512E overlap as a set, and the electrode tabs 514F and 512G overlap as a set.

Because the plus and the minus electrode tabs to compose a set are not yet welded in this state, the flat-type cells in the overlapped state as shown in FIG. 42 is brought to the ultrasonic welding machine 200, and the electrode tabs to compose a set, are welded in order.

When the combined battery is produced as above, because welding of each of the electrode tabs can be performed at the positions not interrupted by other electrode tabs, welding operation becomes easy. Accordingly, freedom of the head shape of the ultrasonic welding machine becomes greater and automation of welding operation becomes easy. In addition, because ultra sound is used for welding, and no mechanical bonding part is present, generation of contact resistance variation or loosening due to vibration is unlikely, and thus sufficient reliability can be kept in endurance-reliability and maintainability.

In addition, in the above, while the case is explained, wherein the combined battery is produced by folding thereof in zigzags as shown in FIG. 44(a), the combined battery can be produced as well by winding thereof in a roll shape, similar to laminating, as shown in the figure (b).

In addition, the present invention is by no means limited to the Embodiments above, and may naturally be altered and/or modified variously within the scope of the claims.

Furthermore, the present application is based on JP-A-2004-161299 applied on May 31, 2004, JP-A-2004-363123 applied on Dec. 15, 2004, and JP-A-2005-068230 applied on Mar. 10, 2005, and the disclosed content thereof is incorporated herein, by reference, in its entirety.

The invention claimed is:

1. A combined battery, comprising:
   first and second units, each including a plurality of flat-type cells, each flat-type cell having a positive electrode tab and a negative electrode tab, wherein the flat-type cells have two major surfaces and a thickness,
   wherein in each of the first and second units, the plurality of flat-type cells are laminated by stacking the flat-type cells in a lamination direction substantially perpendicular to the major surfaces and electrically connected to one another at a respective welding part that connects a positive electrode tab of a first flat-type cell to a negative electrode tab of a second flat-type cell, and portions of the positive electrode tab of the first flat-type cell and the negative electrode tab of the second flat-type cell that are electrically connected to one another by the welding part are offset from a negative electrode tab of the first flat-type cell, a positive electrode tab of the second flat-type cell, and a positive electrode tab and a negative electrode tab of every other flat-type cell in each unit when viewed down into the lamination direction, and
   wherein the first and second units are further electrically connected to one another in series with a unit welding part connecting a positive electrode tab of a flat-type cell in one of the first and second units and a negative electrode tab of a flat-type cell in the other of the first and second units, and portions of the positive electrode tab of the flat-type cell in the one of the first and second units and the negative electrode tab of the flat-type cell in the other of the first and second units that are electrically connected to one another by the unit welding part are offset from a negative electrode tab of the flat-type cell in the one of the first and second units, a positive electrode tab of the flat-type cell in the other of the first and second units, and a positive electrode tab and a negative electrode tab of every other flat-type cell in the first and second units, when viewed down into the lamination direction.

2. A combined battery, comprising:
   a unit including a plurality of flat-type cells, each flat-type cell having a positive electrode tab and a negative electrode tab, wherein the flat-type cells have two major surfaces and a thickness,
   wherein the plurality of flat-type cells are laminated by stacking the flat-type cells in a lamination direction substantially perpendicular to the major surfaces and electrically connected to one another at a respective welding part that connects a positive electrode tab of a first flat-type cell to a negative electrode tab of a second flat-type cell, and portions of the positive electrode tab of the first flat-type cell and the negative electrode tab of the second flat-type cell that are electrically connected to one another by the welding part are offset from a negative electrode tab of the first flat-type cell, a positive electrode tab of the second flat-type cell, and a positive electrode tab and a negative electrode tab of every other flat-type cell in the unit when viewed down into the lamination direction, and
   wherein
   1) the unit is further electrically connected to another flat-type cell in series by a unit welding part connecting a positive electrode tab of a flat-type cell in the unit and a negative electrode tab of the another flat-type cell, and portions of the positive electrode tab of the flat-type cell in the unit and the negative electrode tab of the another flat-type cell that are electrically connected to one another by the unit welding part are offset from a negative electrode tab of the flat-type cell in the unit, a positive electrode tab of the another flat-type cell, and a positive electrode tab and a negative electrode tab of every other flat-type cell in the unit, when viewed down into the lamination direction, or
   2) the unit is further electrically connected to another flat-type cell in series by a unit welding part connecting a positive electrode tab of the another flat-type cell and a negative electrode tab of a flat-type cell in the unit, and portions of the positive electrode tab of the another flat-type cell and the negative electrode tab of the flat-type cell in the unit that are electrically connected to one another by the unit welding part are offset from a negative electrode tab of the another flat-type cell, a positive electrode tab of the flat-type cell in the unit, and a positive electrode tab and a negative electrode tab of every other flat-type cell in the unit, when viewed down into the lamination direction.

3. The combined battery according to claim 1, wherein each flat-type cell has a rectangular shape when viewed down into the lamination direction, and wherein the unit welding part is offset in at least one of (1) a direction of a short length of the flat-type cells and (2) a direction of a long length of the flat-type cells.

4. The combined battery according to claim 2, wherein each flat-type cell has a rectangular shape when viewed down into the lamination direction, and wherein the unit welding part is offset in at least one of (1) a direction of a short length of the flat-type cells and (2) a direction of a long length of the flat-type cells.

5. A combined battery, comprising:
   at least three flat-type cells, each flat-type cell having a positive electrode tab and a negative electrode tab, wherein the flat-type cells have two major surfaces and a thickness,
   wherein all flat-type cells are electrically connected in series and are laminated by stacking the flat-type cells in a lamination direction substantially perpendicular to the major surfaces and a positive electrode tab of one of a first flat-type cell and a second flat-type cell and a negative electrode tab of the other of the first flat-type cell and the second flat-type cell are selectively and electrically connected to one another at a welding part connecting electrode tabs of the first and second flat-type cells,
   wherein a positive electrode tab and a negative electrode tab of a third flat-type cell, which is laminated next to the first and second flat-type cells connected by the welding part, are offset from portions of the positive electrode tab of the one of the first flat-type cell and the second flat-type cell and the negative electrode tab of the other of the first flat-type cell and the second flat-type cell that are electrically connected to one another by the welding part, when viewed down into a lamination direction.

6. The combined battery according to claim 5, wherein the welding part is offset from a negative electrode tab of the one of the first flat-type cell and the second flat-type cell, a positive electrode tab of the other of the first flat-type cell and the second flat-type cell, and a positive electrode tab and a negative electrode tab of every other flat-type cell in the at least three flat-type cells, when viewed down into the lamination direction.

7. The combined battery according to claim 5, wherein each flat-type cell has a rectangular shape when viewed down into the lamination direction, and wherein the welding part is offset in a direction of a short length of the flat-type cells.

8. The combined battery according to claim 6, wherein each flat-type cell has a rectangular shape when viewed down into the lamination direction, and wherein the welding part is offset in a direction of a short length of the flat-type cells.

9. The combined battery according to claim 5, wherein each flat-type cell has a circular shape or a polygonal shape with at least as many sides as a pentagon, when viewed down into the lamination direction, and
wherein the positive electrode tab of the one of the first flat-type cell and the second flat-type cell and the negative electrode tab of the other of the first flat-type cell and the second flat-type cell that are electrically connected by the welding part protrude from a different position along a circumference of the circular or the polygonal shape than other positive and negative electrode tabs that are electrically connected, when viewed down into the lamination direction.

10. The combined battery according to claim 6, wherein each flat-type cell has a circular shape or a polygonal shape with at least as many sides as a pentagon, when viewed down into the lamination direction, and
wherein the positive electrode tab of the one of the first flat-type cell and the second flat-type cell and the negative electrode tab of the other of the first flat-type cell and the second flat-type cell that are electrically connected by the welding part protrude from a different position along a circumference of the circular or the polygonal shape than other positive and negative electrode tabs that are electrically connected, when viewed down into the lamination direction.

11. A method for producing a combined battery, comprising:
forming first and second units each including a plurality of flat-type cells, each flat type-cell having a positive electrode tab and a negative electrode tab, wherein the flat-type cells have two major surfaces and a thickness,
wherein the plurality of flat-type cells are laminated by stacking the flat-type cells in a lamination direction substantially perpendicular to the major surfaces and electrically connected to one another by a respective welding part that connects a positive electrode tab of a first flat-type cell to a negative electrode tab of a second flat-type cell, wherein portions of the positive electrode tab of the first flat-type cell and the negative electrode tab of the second flat-type cell that are electrically connected to one another by the respective welding part are offset from a negative electrode tab of the first flat-type cell, a positive electrode tab of the second flat-type cell, and a positive electrode tab and a negative electrode tab of every other flat-type cell in each unit, when viewed down into the lamination direction, and
forming the combined battery by further electrically connecting a positive electrode tab of a flat-type cell in one of the first and second units and a negative electrode tab of a flat-type cell in the other of the first and second units,
wherein portions of the positive electrode tab of the flat-type cell in the one of the first and second units and the negative electrode tab of the flat-type cell in the other of the first and second units that are electrically connected to one another in series by a unit welding part are offset from a negative electrode tab of the flat-type cell in the one of the first and second units, a positive electrode tab of the flat-type cell in the other of the first and second units, and a positive electrode tab and a negative electrode tab of every other flat-type cell in the first and second units, when viewed down into the lamination direction.

12. The method for producing the combined battery according to claim 11, wherein each flat-type cell has a rectangular shape when viewed down into the lamination direction, and wherein the respective welding part is offset in at least one of (1) a direction of a short length of the flat-type cell and (2) a direction of a long length of the flat-type cell.

13. A method for producing a combined battery, comprising:
forming a unit including a plurality of flat-type cells, each flat-type cell having a positive electrode tab and a negative electrode tab, wherein the flat-type cells have two major surfaces and a thickness,
wherein the plurality of flat-type cells are laminated by stacking the flat-type cells in a lamination direction substantially perpendicular to the major surfaces and electrically connected to one another at a respective welding part that connects a positive electrode tab of a first flat-type cell to a negative electrode tab of a second flat-type cell, wherein portions of the positive electrode tab of the first flat-type cell and the negative electrode tab of the second flat-type cell that are electrically connected to one another by the respective welding part are offset from a negative electrode tab of the first flat-type cell, a positive electrode tab of the second flat-type cell, and a positive electrode tab and a negative electrode tab of every other flat-type cell in the unit, when viewed down into the lamination direction, and
forming the combined battery by
1) further electrically connecting a positive electrode tab of a flat-type cell in the unit and a negative electrode tab of another flat-type cell in series by a welding part, wherein portions of the positive electrode tab of the flat-type cell in the unit and the negative electrode tab of the another flat-type cell that are electrically connected to one another by the welding part are offset from a negative electrode tab of the flat-type cell in the unit, a positive electrode tab of the flat-type cell in the another flat-type cell, and a positive electrode tab and a negative electrode tab of every other flat-type cell in the unit, when viewed down into the lamination direction, or
2) further electrically connecting a positive electrode tab of another flat-type cell and a negative electrode tab of a flat-type cell in the unit in series by a welding part, wherein portions of the positive electrode tab of the another flat-type cell and the negative electrode tab of the flat-type cell in the unit that are electrically connected to one another by the welding part are offset from a negative electrode tab of the another flat-type cell, a positive electrode tab of the flat-type cell in the unit, and a positive electrode tab and a negative electrode tab of every other flat-type cell in the unit, when viewed down into the lamination direction.

14. The method for producing the combined battery according to claim 13, wherein each flat-type cell has a rectangular shape when viewed down into the lamination direction, and wherein the respective welding part is offset in at least one of (1) a direction of a short length of the flat-type cell and (2) a direction of a long length of the flat-type cell.

15. A method for producing a combined battery including at least three flat-type cells, each flat-type cell having a positive electrode tab and a negative electrode tab, wherein the flat-type cells have two major surfaces and a thickness, wherein all flat-type cells are electrically connected in series and are laminated by stacking the flat-type cells in a lamination direction substantially perpendicular to the major surfaces, the method comprising:

selectively and electrically connecting a positive electrode tab of one of a first flat-type cell and a second flat-type cell and a negative electrode tab of the other of the first flat-type cell and the second flat-type cell with a welding part, wherein portions of the positive electrode tab of the one of the first flat-type cell and the second flat-type cell and the negative electrode tab of the other of the first flat-type cell and the second flat-type cell that are electrically connected to one another by the welding part are offset from an electrode tab of a third flat-type cell, which is laminated next to the first and second flat-type cells connected by the welding part, when viewed down into the lamination direction.

16. The method for producing a combined battery according to claim 15, wherein the welding part is offset from a negative electrode tab of the one of the first flat-type cell and the second flat-type cell, a positive electrode tab of the other of the first flat-type cell and the second flat-type cell, and a positive electrode tab and a negative electrode tab of every other flat-type cell, when viewed down into the lamination direction.

17. The method for producing a combined battery according to claim 15, wherein each flat-type cell has a rectangular shape, when viewed down into the lamination direction, and wherein the welding part is offset in a direction of a short length of the flat-type cell.

18. The method for producing a combined battery according to claim 16, wherein each flat-type cell has a rectangular shape, when viewed down into the lamination direction, and wherein the welding part is offset in a direction of a short length of the flat-type cell.

19. The method for producing a combined battery according to claim 15, wherein the flat-type cells are laminated by folding a series of the flat-type cells in zigzags or winding the flat-type cells in a roll-shape.

20. The method for producing a combined battery according to claim 16, wherein the flat-type cells are laminated by folding a series of the flat-type cells in zigzags or winding the flat-type cells in a roll-shape.

21. The method for producing a combined battery according to claim 17, wherein the flat-type cells are laminated by folding a series of the flat-type cells in zigzags or winding the flat-type cells in a roll-shape.

22. The method for producing a combined battery according to claim 15, wherein each flat-type cell has a circular shape or a polygonal shape with at least as many sides as a pentagon, when viewed down into the lamination direction, and wherein the positive electrode tab of the one of the first flat-type cell and the second flat-type cell and the negative electrode tab of the other of the first flat-type cell and the second flat-type cell that are electrically connected by the welding part protrude from a different position along a circumference of the circular or the polygonal shape from other positive and negative electrode tabs that are electrically connected, when viewed down into the lamination direction.

23. The method for producing a combined battery according to claim 16, wherein each flat-type cell has a circular shape or a polygonal shape with at least as many sides as a pentagon, when viewed down into the lamination direction, and wherein the positive electrode tab of the one of the first flat-type cell and the second flat-type cell and the negative electrode tab of the other of the first flat-type cell and the second flat-type cell that are electrically connected by the welding part protrude from a different position along a circumference of the circular or the polygonal shape from other positive and negative electrode tabs that are electrically connected, when viewed down into the lamination direction.

24. The method for producing the combined battery according to claim 11, wherein the plurality of flat-type cells are electrically connected to one another by ultrasonic welding.

* * * * *